United States Patent [19]

Sivak et al.

[11] Patent Number: 5,329,037
[45] Date of Patent: Jul. 12, 1994

[54] INCORPORATION OF FUNCTIONAL GROUPS IN POLYMERS

[75] Inventors: Andrew J. Sivak, Edgewood Borough; Leonard A. Cullo, Hempfield Township, both of Pa.

[73] Assignee: Aristech Chemical Corporation, Pittsburgh, Pa.

[21] Appl. No.: 21,488

[22] Filed: Apr. 23, 1993

Related U.S. Application Data

[60] Division of Ser. No. 532,850, Apr. 16, 1990, which is a continuation-in-part of Ser. No. 257,895, Oct. 14, 1988, abandoned, which is a continuation-in-part of Ser. No. 47,960, May 8, 1987, abandoned.

[51] Int. Cl.$^5$ ............................ C07F 7/08; C07F 7/18
[52] U.S. Cl. ..................................................... 556/464
[58] Field of Search ........................................ 556/464

[56] References Cited

U.S. PATENT DOCUMENTS

| | | | |
|---|---|---|---|
| 2,396,692 | 3/1946 | Garner | 260/80 |
| 3,083,219 | 3/1963 | Anderson | 260/448.8 |
| 3,125,554 | 3/1964 | Cooper et al. | 260/88.1 |
| 3,418,293 | 12/1968 | Bolchert | 260/80 |
| 4,675,426 | 6/1987 | Crivello | 556/464 |
| 4,916,248 | 4/1990 | Brownell et al. | 556/486 |
| 4,970,329 | 11/1990 | Sivak et al. | 556/486 |
| 5,008,421 | 4/1991 | Brownell et al. | 556/406 |
| 5,099,052 | 3/1992 | Laine et al. | 556/464 X |
| 5,110,971 | 5/1992 | Hays et al. | 556/446 |
| 5,191,102 | 3/1993 | Oyama et al. | 556/464 |

OTHER PUBLICATIONS

PCT International Publication No. WO 88/08856 (also identified as International Application No. PCT/US87/03454), Sivak et al, "Incorporation of Functional Groups in Polymers", Nov. 17, 1988, pp. 1–56.

Boor, Ziegler–Natta Catalysts and Polymerizations, Academic Press, Inc., London (1979), pp. 532–533 and p. 534.

"O-Trimethylsilyl-Allyl Alcohol" formula, Petrarch Systems, Bristol, Pa., p. 146.

Giannini et al, Stereospecific Polymerization of Monomers Containing Oxygen and Nitrogen with Ziegler–Natta Catalysts, Polymer Letters, vol. 5, pp. 527–533, (1967).

Giannini et al, Polymerization of Nitrogen-Containing and Oxygen-Containing Monomers by Ziegler–Natta Catalysts, J. Polymer Sci.:Part C 22, pp. 157–175, (1968).

"Polymerization of Monomers Containing Functional Groups Protected by Trialkylsilyl Groups", Hirao et al, Macromolecules 1986, 19, 1294–1299.

*Primary Examiner*—Paul F. Shaver
*Attorney, Agent, or Firm*—William L. Krayer

[57] ABSTRACT

New polymers are disclosed to be made in supported Ziegler-Natta systems. They include monomers exhibiting polar functionality such as through a hydroxyl group or other functional group protected during polymerization in the presence of highly active catalysts by the use of a protective alkyl silane group which is removed after polymerization to restore the functionality of the group. The typical polymer thus made is a polyolefin having functional groups on its backbone; the functional groups may be reacted with conventional dyes and/or may perform other functions and enter reactions with other reactive compounds.

1 Claim, No Drawings

INCORPORATION OF FUNCTIONAL GROUPS IN POLYMERS

RELATED APPLICATION

This is a division of application Ser. No. 532,850, filed Apr. 16, 1990, which is a continuation-in-part of Ser. No. 257,895, filed Oct. 14, 1988, now abandoned, which is a continuation-in-part of our patent application Ser. No. 047,960, filed May 8, 1987, now abandoned.

TECHNICAL FIELD

This invention relates to the art of making polymers and particularly to the manufacture of stereoregular copolymers in supported Ziegler-Natta polymerization systems wherein the manufactured copolymers contain active groups. For example, our invention includes the manufacture of stereoregular polyolefins such as polypropylene which may be colored or dyed by color-imparting agents chemically bonded directly to the backbone of the polymer. Such a dyeing or coloring technique may be referred to as an integral dyeing technique because of the incorporation of comonomers having functional (dye-receptive) groups, as distinguished from coloring or dyeing involving a physical mixture of polyolefin and a color-imparting material. The invention contemplates methods of making dyeable polymers, methods of dyeing the dyeable stereoregular polymers, the dyeable polymers as compositions, and the integrally dyed polymer products. The invention also comprehends a method of protecting a highly active supported polymerization catalyst system from attack by functional groups in monomers even in the absence of a so-called modifier, of protecting the latent functionality of monomers from the supported catalyst system during the polymerization reaction, copolymers including such monomers, the "deprotected" copolymers and the "re-functionalized" polymers as end products.

Moreover, this invention relates to methods of imparting to crystalline or stereoregular polyolefins properties other than dyeability. It will be seen that our invention includes a class of stereoregular copolymers of olefin monomers, particularly propylene, and special ethylenically unsaturated monomers which have polar or other active groups on them capable of further reaction to impart new and other properties to the polyolefin copolymers, such as the ability to absorb moisture and the ability to cross-link and/or form graft-like copolymers with monomers normally unable to graft or cross-link with olefin polymers.

A particularly attractive and surprising feature of our invention is the enhanced stereoregularity of the polymer products compared to the stereoregularity of 1-olefins homopolymerized under similar conditions.

The new stereoregular copolymers, protected and modified, are made possible by the use of the protected functional monomers and method of polymerizing them with a supported Ziegler-Natta catalyst.

BACKGROUND ART

Prior to the present invention, a practical, efficient method of integrally dyeing polypropylene and certain other polymers has eluded researchers in the art.

Generally, when we speak herein of dyeable polymers such as dyeable polypropylene, we mean to include polymers receptive to the chemical addition or substitution of modifying groups other than dyes, as will become apparent to those skilled in the art. The fast dyeing of fabrics has long been accomplished through reliance on polar functionalities which are present in the fibers; the dyes are typically designed to react with the polar groups. Polypropylene, however, whether in the form of synthetic fiber or other more substantial three-dimensional form, must be colored through methods such as physical mixing of colorant or through a relatively expensive and frequently ineffective method of treatment. Pure polypropylene has no reactive groups at all, and of course no polar groups. To our knowledge, attempts to incorporate a monomer having reactive groups such as polar groups into the backbone of polypropylene by copolymerization have been failures. Typically such a monomer will not survive contact with the commonly used Ziegler-Natta catalyst and particularly the highly-active supported types of the present generation.

By integral dyeing, we mean a dyeing technique which employs "dyesites" as that term is used, for example, in U.S. Pat. No. 3,533,731. In this patent to Schmidl and Jennings, the dyesites are nitrogen-containing and are introduced by way of the monomer N,N-diisopropyl-7-octenylamine. The patent also recites the use of vinyl pyridine to provide nitrogen reactive sites for dyes. Such copolymers of propylene have not found widespread use because the reactivity of the functional nitrogen group makes it too vulnerable to unwanted reactions during the polymerization phase, i.e. in the presence of polymerization catalysts.

More broadly, it may be stated that prior to the present invention a practical method of employing supported Ziegler-Natta catalysts for the copolymerization of monomers containing functional groups has not been developed.

Silicon-containing polymers have been produced by hydrosilation of the unsaturated groups in polybutadiene—see U.S. Pat. No. 4,230,815. Small amounts of various polymerizable hydrolyzable silanes are employed in U.S. Pat. No. 4,481,322 as part of a filler including various di-unsaturated monomers.

A number of polymerizable silicone esters and silane monomers are disclosed in U.S. Pat. No. 4,454,295, and copolymerized with various acrylates and cellulose esters to make a material for use in manufacturing contact lenses. See also U.S. Pat. Nos. 3,504,998 and 3,709,656 which also employ various silicon-containing monomers.

A silane compound represented by the formula $RSiR'_nY_{3-n}$ wherein R is a member selected from the group consisting of ethylenically unsaturated hydrocarbyl and hydrocarbyloxy groups, R' is an aliphatic saturated hydrocarbyl group, Y is a hydrolyzable organic group, and n is zero, 1, or 2 is employed as a comonomer with ethylene and made to cross-link through the use of water in the presence of a catalyst to promote condensation linkages, in U.S. Pat. No. 4,297,310. Certain cyclic compounds are polymerized in U.S. Pat. No. 3,920,714 to produce polymers with silyl side groups, and certain polyenes containing silyl groups are shown in U.S. Pat. No. 4,028,483. Certain alpha-unsaturated compounds containing silyl-protected oxygen have been shown in the prior art in a context where they are not used for polymerization. See "Reaction of trialkyl (aryl) silanes with unsaturated -oxides", I. E. Sharikova and V. M. Al'bitskaya, *Izv. Vyssh. Ucheb. Zaved., Khim. Khim. Tekhnol.*, 9(4), 595–599 (1966), In Russian; contains reference to $H_2C=CH-CH_2-CH_2-O-SiEt_3$. The reaction parameters cited (boiling point=76°-7° C. at 11 mm Hg, density=0.826 g/ml) agree with the present specification. The compound was prepared from reaction of the -oxide of 1,3-butadiene and triethylsilane, in isopropanol in the presence of chloroplatinic acid ($H_2PtCl_6$). No use of material was cited in the abstract. See "Reaction of triethylsilane with unsaturated alcohols" E. Lukevics and M. G. Voronkov, *Khim. Geterotsikl. Soedin., Akad. Nauk Latv. SSR*, 1965(2), 179–86, In Russian. Primary alcohols (like allyl alcohol) react with triethylsilane in the presence of $H_2PtCl_6$ to form triethylsilyl enol ethers (like $H_2C=CH-CH_2-O-SiEt_3$) with evolution of hydrogen. Secondary ethylenic alcohols (e.g. 1-buten-3-ol=$H_2C=CHCH(OH)CH_3$) react to give the silyl ether ($H_2C=CHCH(OSiEt_3)CH_3$) and products of addition across the double bond [hydrosilation] ($Et_3Si-CH_2-CH_2-CH-CH_3$) and ($H_3CCH(SiEt_3)CH_2CH_3$). No uses cited in the abstract. See "Allyloxy carbanions. New synthesis of aldehydes via a β-acyl carbanion equivalent" W. Clark Still and T. L. Macdonald, *J. Am. Chem. Soc.* 1974, 96(17), 5561-3. $H_2C=CH-CH_2OSiEt_3$ is used to synthesize β-alkylated aldehydes. See "Allyloxycarbanions. A synthesis of 3,4-dihydroxy-1-olefins from carbonyl compounds", W. Clark Still and T. L. Macdonald, *J. Org. Chem.* 1976, 41(22), 3620-2. $H_2C=CHCH_2OSiR_3$ (R=Me, Et) gave stable allyl lithium reagents. See "Conversion of monoalkyl olefins to 1,1-dialkyl olefins by reaction with bis(cyclopentadienyl)titanium dichloride-trialkylaluminum" James J. Barber, Carl Willis, and George M. Whitesides, *J. Org. Chem.*, 1979, 44(20), 3603–4. Synthesis of (5-hexenyloxy) trimethyl silane which is $H_2C=CH-(CH_2)_4-OSiMe_3$.

The reader may be interested in the following patents which disclose various methods of making dyeable polypropylene, none of which is similar to ours: U.S. Pat. Nos. 3,419,638, 3,779,703, and 3,131,990.

Special interest may be directed to U.S. Pat. Nos. 3,655,633, 3,857,825, 3,929,850, and 3,920,715 which disclose polymers having silyl end groups. In addition, it should be observed that the compounds O-trimethylsilylallyl alcohol $(CH_3)_3Si-OCH_2CH=CH_2$ and N-trimethyl-silylallylamine are known compounds offered for experimentation by Huls America (formerly Petrarch Systems) of Bristol, Pa. The compound 2-[(trimethylsilyl)oxy] ethyl methacrylate has been polymerized by Hirao, Kato, Yamaguchi and Nakahama as reported in Macromolecules 1986, 19, 1294–1299. The polymerization of certain monomers protected with silyl groups, specifically 4-vinyl phenol, 2-(4 vinylphenyl) ethanol, and 4-vinylaniline, are reported in the same article; however, none of the polymerizations is with a Ziegler-Natta catalyst. A series of hydrogenalkenyloxysilanes is reported in U.S. Pat. No. 4,294,975.

In addition to the above-recited prior art, we have become aware, through citation by the examiner in the parent application Ser. No. 947,960 of Garner U.S. Pat. No. 2,396,692, which shows the polymerization of RO-SiR'$_3$, for example where R contains an olefin group and R' may be an alkyl group; however, the polymerization is not effected by a Ziegler catalyst and is not stereospecific. Also cited was Natta et al U.S. Pat. No. 3,223,686, which copolymerizes certain silicon-containing monomers with ethylene; however, the silicon-containing monomers contain no oxygen. Bolchert, in U.S. Pat. No. 3,418,293, employs a Ziegler-type composition which in fact operates as an initiator to make polyvinyl alcohol using monomers of the formula $CH_2=CHOSi(R)_3$, achieving stereoregularity promoted by the non-polar nature of the solvent. Anderson, in U.S. Pat. No. 3,083,219 was also cited for its recitation that 3-buteneoxytrimethylsilane will polymerize with a specific Ziegler catalyst and the polymer can be hydrolyzed to form adhesive and coating compositions. The examiner also cited Boor, Jr., ZIEGLER-NATTA CATALYSTS AND POLYMERIZATIONS, Academic Press, Inc., London (1979), pages 532-533, which describes certain criteria to improve the ability of a polar compound to polymerize in a Ziegler-Natta system. Boor in turn cites U. Giannini, G. Bruckner, E. Pellino, and A. Cassata, *J. Polym. Sci.*, Part B5, 527 (1967); Part C22, 157 (1968), which describes the inherent difficulty in homopolymerization of monomers containing —$OSiR_3$ groups employing unsupported Ziegler-Natta catalysts. However, none of the references has the combination of factors and elements of our invention as expressed herein.

DISCLOSURE OF INVENTION

We have invented a method of making high molecular weight highly stereoregular copolymers having functional groups. The invention involves the introduction to an olefin polymer chain of reactive sites which may be employed for other purposes as well as the fixation of dyes, by the use of specially made monomers blocked with silyl groups more fully described elsewhere herein, and the polymerization of the monomers in the presence of other copolymerizable olefinic monomers in a polymerization system comprising a transition metal containing salt, a base metal alkyl, and optionally an external donor, i.e. a supported Ziegler-Natta catalyst system.

Within the term "Ziegler-Natta catalysts" we mean to include all the catalysts and/or catalyst systems discussed by John Boor, Jr., in his book ZIEGLER-NATTA CATALYSTS AND POLYMERIZATIONS (Academic Press, 1979) particularly pages 33–35 under the subheading "Definition of Ziegler-Natta Catalysts", incorporated by reference herein. Generally, the term "Ziegler-Natta catalysts" includes all metal alkyls (or hydrides) of Groups I to III base metals together with transition metal salts of Groups IV to VIII transition metals. As discussed by Dr. Boor, this broad definition includes some combinations which are not commercially practical or even effective enough for laboratory study with certain monomers. The term "Ziegler-Natta catalyst" is also intended to include the possible presence of third or fourth substances such as electron donors, support materials, and the like. It should be observed also that an important feature of our invention is the protection of the Ziegler-Natta catalyst from destructive attack by an active group which it is desired to insert in a polymer. This is accomplished in the context of a Ziegler-Natta catalyst in which the heavy metal containing component is present on a support such as an aluminum, silicon or magnesium oxide or, more frequently in the latest generations of catalysts, on magnesium chloride which may in turn be deposited on an inert support. Thus the term "supported Ziegler-Natta catalyst" assumes a supported polymerization system which is operable and effective to make a polymer so long as the catalyst is not rendered ineffective by an extrinsic substance such as a monomer containing an active group. Our preferred process specifically employs a magnesium chloride support.

Supported Ziegler-Natta catalysts have evolved to provide very high yields. The latest generation of propylene polymerization catalysts differs from the original Ziegler-Natta catalysts in that they require a "modifier" to insure that the polymer is highly stereoregular or, especially, highly isotactic. If it is not present during polymerization, the resultant polypropylene is not very stereoregular. The original (unsupported) catalysts produced stereoregular polymer, in relatively low yields, without this modifier. In the most effective catalysts of the latest type, this "modifier" is a di- or tri-alkoxy silane.

We have found that the stereoregularity as interpreted from NMR spectroscopy of the copolymers produced according to our invention from propene and the alkenoxysilanes protected by at least five carbon atoms, as described elsewhere herein, is always quite high. In other words, the proportion of methyl groups in an isotactic relationship is greater than 33% and typically in the range of 50% to 85%. This is true even when no modifier is added to the catalyst system, as is otherwise usual, to insure that a highly stereoregular or isotactic polymer results. With or without a modifier, our preferred catalyst is a titanium chloride catalyst on a magnesium chloride support.

Effective polymerization conditions, i.e. pressure, temperature, solvent and the like for Ziegler-Natta catalyst systems are well known; our invention is applicable to effect blocking of the monomer reactive sites at least to some degree under any such polymerization conditions.

The blocking of the reactive sites on the monomers, which our technique accomplishes, prevents them from attacking and/or destroying the Ziegler-Natta catalyst. After polymerization, and removal of the blocking groups, the reactive sites may find use to improve the compatibility of otherwise hydrophobic polymers into which they are incorporated such as polypropylene, polyethylene, and copolymers of propylene, ethylene and other alpha olefins having up to about 18 carbon atoms, with more hydrophilic polymers such as nylon, polyesters and cellulosics. Such hydrophobic and hydrophilic polymers often are miscible in the molten state, but solidify into separate phases. But with a hydrophilic moiety integrated in the polyolefin, they will tend to blend in a much more intimate fashion even in the solid state. Our monomers and new polymers may also be used to form covalent linkages to various other functional groups, hydrocarbyl fragments, functionalized hydrocarbyl fragments, and other organic and inorganic moieties. Similarly they may function as graft sites for other polymeric chains. The introduction of such functional, organic and inorganic groups to a predominantly polyolefin chain imparts properties to them hitherto unknown such as, for example, dyeability particularly by basic and reactive dyes, crosslinkability, adhesivity, wetability, and resistance to oxidative degradation.

In addition to blocking the reactive sites, we have found that the use of our silylated monomers enhances the stereoregularity of the polymers made.

As used herein, the term "stereoregular" may include segments derived from ethylene monomers, even though that term may not be strictly appropriate thereto.

A paradigm of our technique is as follows:

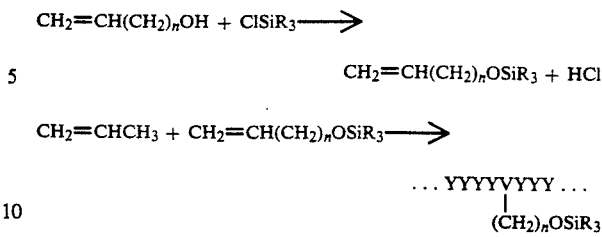

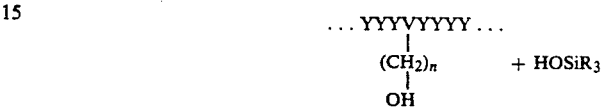

where n is a whole number from about 2 to about 21; we prefer about 3 to about 10. Each R is independently selected from alkyl, aryl, aralkyl, alicyclic and oxyalkyl groups having from about 1 to about 20 carbon atoms and the total number of carbon atoms in the R groups must be at least 4;

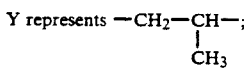

and

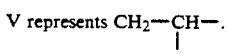

Normally the reaction of the silyl monomer with propylene (or other olefin having up to 10 carbon atoms) will be in a relatively high ratio of propylene to silyl monomer, since many properties can be imparted to the polypropylene with less than about 5% of the silyl comonomer polymerized with the propylene while maintaining a high molecular weight; however, copolymers with very high percentages of silyl monomer can readily be made and are useful within our invention. For example, copolymers of 50 mole percent, silyl monomer and the balance lower olefin monomers such as ethylene or propylene, or both, are within our invention, as are copolymers of 0.05 mole percent or even as little as 0.01 mole percent silyl monomer and the balance such olefin monomers. Particularly useful copolymers are copolymers of about 0.5 to about 15 mole percent silyl-containing monomers and the balance alpha-olefins containing from 2 to 10 carbon atoms, preferably propylene. All such copolymers exhibit stereoregularity. Stereoregularity in this context is intended to include copolymers of the silyl monomers with ethylene, in that the silyl mer units tend to be stereoregularly oriented and the ethylene groups polymerized in a Ziegler-Natta system tend to be entirely linearly oriented, i.e. without any branches. Of course, stereoregularity in silyl-ethylene copolymers is more discernable in the higher ratios of silyl to ethylene met units. Alpha-olefin/silyl copolymers of this invention where the alpha-olefin has three carbon atoms or more are generally highly stereoregular, i.e. at least about 80% stereoregular; when a donor such as DPMS is used in addition, they are regularly 90% or more stereoregular. For our purposes a polymer which is about 60% stereoregular may be considered substantially stereoregular.

Monomers containing silyl groups, such as those of the above paradigm formula $CH_2=CH(CH_2)_nOSiR_3$, and others used within the scope of the present disclosure tend to be beneficial in controlling stereoregular polymerization, and are incorporated in the polymer chain at a more or less predictable rate dependent on concentration and reactivity ratios; they are incorporated by way of olefin insertion onto metal-carbon single bonds.

Our invention includes the polymerization of compounds of the formula $CH_2=CH(CH_2)_nOSiR_3$ where n is an integer from 1 to about 21, and each R is independently selected from alkyl, alkaryl, alkoxy, alicyclic and aryl groups having from 1 to 10 carbon atoms and the total of carbon atoms in the R groups is at least 5. More generally, our invention includes at least one alpha-olefin and at least about 0.01 mole percent (preferably at least 0.05 mole percent) silyl-containing monomers of the general formula $$[CH_2=CHCH_2]_y(X)[O_wSiR_{4-w}]_z$$

where
y is 1 or 2
w is 1 or 2
z is 1 or 2

(X) is a connecting hydrocarbyl fragment [that is, a linkage of bonded carbon and hydrogen atoms having a valence of (y+z w)] having from 1 to about 20 carbon atoms, and each R is independently selected from alkyl, alkoxy, alicyclic, aryloxy, alkaryl and aryl groups having from 1 to about 20 carbon atoms, provided that the total of carbon atoms in all R's together with all carbons directly attached to the carbon in X connected to an O is at least 5.

By a "connecting hydrocarbyl fragment" is meant a connecting fragment consisting of carbon and hydrogen having a "valence" of at least 2 for connecting to an allyl group (when y is 1) and on oxygen (when w and z are 1), but which may alternatively have a "valence" of 3 when one of y or w is 2 with z being 1, or 4, when both y and w are 2, also with z being 1. The 1 to 20 carbon atoms may be otherwise arranged in the form of alkyl groups or fragments, by which is meant to include linear alkyl fragments such as $-CH_2CH_2CH_2CH_2-$ or branched alkyl fragments such as

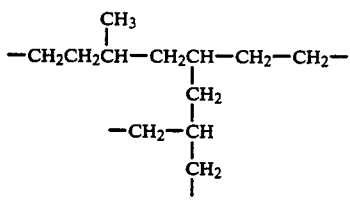

or in the form of aryl groups (fragments) such as for example,

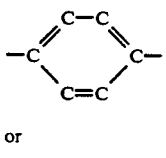

or

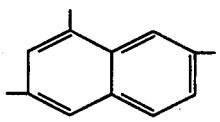

or in the form of alkaryl groups (fragments) such as, for example,

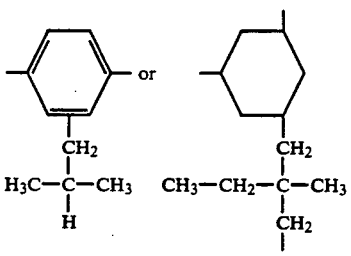

Where w is 2, there will be two oxygens, both coordinated to the silicon. Where y is 2, there will be two allyl groups.

The phrase "provided that the total of carbon atoms in all R's together with all carbons directly attached to the carbon in X connected to an O is at least 5" means that there must be at least 4 carbon atoms in the three independently selected R's or, if not, the only possibility is that the three independently selected R's would have three carbon atoms and the configuration of (X) in the vicinity of O would be, for example, either

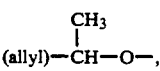

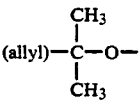

or

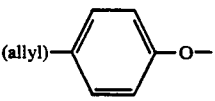

In each example above, it will be seen that there are at least two carbons directly attached to the carbon attached to the oxygen so that, if there are only three carbon atoms in the R's, the proviso will be satisfied. Only if there are at least four carbon atoms in the R's can there be only one carbon in (X).

More specifically, the proviso is satisfied by the following examples:

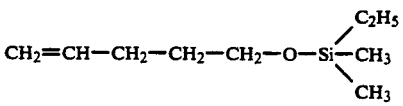

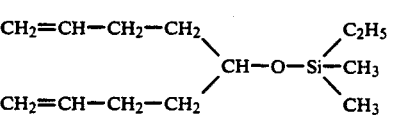

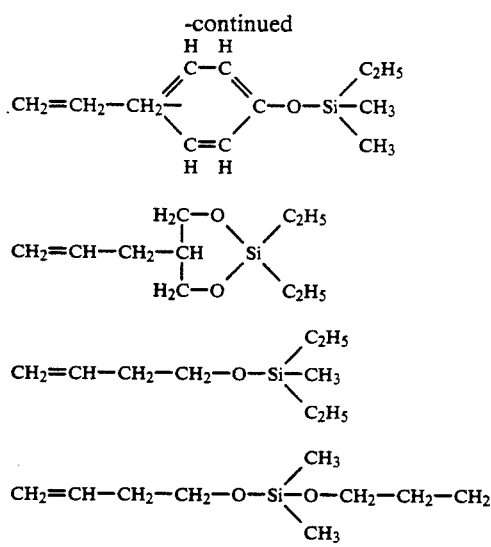

Our invention will be further described with reference to the following examples.

Three general synthesis procedures were followed in the work described herein. We do not intend to be limited to these methods of synthesis.

Method I, a general procedure for the synthesis of alkenoxy silanes and aralkenoxy silanes was as follows:

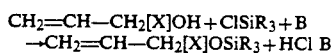
$$CH_2=CH-CH_2[X]OH + ClSiR_3 + B$$
$$\rightarrow CH_2=CH-CH_2[X]OSiR_3 + HCl\ B$$

where X and R are as defined as above, B is a hydrogen halide acceptor such as pyridine, and other halides may be substituted for the chlorine. Generally the same procedure applies to the "paradigm" described above.

All operations were performed under inert gas, usually argon, by standard Schlenk techniques or in a glove box/bag. All liquid reagents not supplied under inert atmosphere were purged with inert gas for at least 5 minutes prior to use; otherwise they were used as received, as were solid reagents.

A round bottom flask with side arm was fitted with magnetic stirring bar and a gas inletted addition funnel. The apparatus was assembled hot (from a drying oven), evacuated and refilled with inert gas. The evacuation/refill cycle was repeated between three and six times.

The flask was charged with a given amount of aralkenol [an organic compound containing at least one hydroxy group (HO—) and at least one terminal olefinic bond ($H_2C=CH-$) connected by an organic fragment described as X above, composed mainly of carbon and hydrogen and minimally being the methylene moiety ($-CH_2-$)], one, or slightly more than one, mole of a hydrogen halide acceptor (typically pyridine) per mole of —OH and enough inert solvent to allow facile stirring even in the presence of the hydrogen halide acceptor salt which will precipitate from solution. The solvent was chosen for convenience of removal later. Generally low boiling solvents were used, such as ether. The addition funnel was charged with one mole halide (as halo silane—typically chloro tri-aralkyl silane) per mole of hydroxyl and a small to moderate amount of solvent. With stirring, the solution in the flask was cooled to about 0° C. and a slow addition of the halo silane was performed. After the addition was completed, the mixture was stirred for at least a half hour at 0° C. and then allowed to warm to room temperature, generally overnight. At this stage the reaction mixture can be left for extended periods of time provided moisture is excluded.

The solid hydrogen halide acceptor complex was filtered off and washed with a volume of the inert solvent at least equal to about one-third the amount used during the reaction. Failure to thoroughly wash the solid tended to lower the isolated yield and resulted in yield estimations based on the weight of the recovered solid of more than 100%.

If the inert solvent were low boiling, it was next distilled from the flitrate. Otherwise it would subsequently be separated from the product by vacuum distillation.

The usual method of product purification consisted of an atmospheric pressure distillation followed by a vacuum distillation from a mixture of the once distilled product and triethyl aluminum (TEA). TEA addition was used to facilitate distillation by combining with reactive compounds which were expected to boil near the boiling point of the desired monomer. Elimination of TEA addition may easily be effected, for example, by careful distillation. The addition of TEA was a convenience rather than a necessity. If the product was expected to boil near the temperature at which TEA boils the addition of TEA was avoided. Similarly if the product was expected, or found, to boil at a very high temperature the atmospheric pressure distillation was not performed, in which case TEA was added or not to the reduced pressure distillation. And finally if a poly-test indicated satisfactory performance with a once distilled (or non-TEA containing) distillation, the second (or TEA containing) distillation could be eliminated. Purification with TEA is not related to the use of the Ziegler-Natta systems except with respect to the generally improved polymerization results; however, even impure materials have polymerized to some degree. Boiling point information was obtained from these distillations. Atmospheric pressure boiling points were uncorrected for actual atmospheric pressure at time of distillation.

For convenience in handling, a rough estimate of the density of each product was made by weighing an empty calibrated syringe and the same syringe containing a known volume of the product. The weight difference and indicated volume were used to calculate a density estimate. This procedure was used for the first few times a product was transferred and, when convenient to obtain accurate weight information, afterwards.

A second method applies to the synthesis of aralkenoxy silanes:

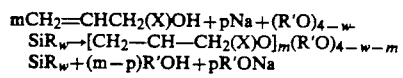
$$mCH_2=CHCH_2(X)OH + pNa + (R'O)_{4-w}\\SiR_w \rightarrow [CH_2-CH-CH_2(X)O]_m(R'O)_{4-w-m}\\SiR_w + (m-p)R'OH + pR'ONa$$

where m is an integer from 1 to (4−w), R' is an alkyl group chosen so that R'OH has a low boiling point (preferably less than about 125° C.), w is an integer from 0 to 3, and p is a small number less than 1.

The general apparatus set up was as for Method 1 except no addition funnel was required. The aralkenol and aralkoxy aralkyl silane in a 1:1 molar ratio were combined in a flask to which was then added approximately 0.01 mole of sodium per mole of aralkenol. Alternately the aralkenol and the sodium were reacted together before the silane was added. In either case the mixture was stirred at room temperature till the sodium dissolved. This was done under a static head of inert gas. Upon dissolution of the sodium, the reaction flask was fitted with a distillation head, condenser and collection flask. The temperature of the reaction mixture was raised to 10°-20° C. above the boiling point of the alcohol to be distilled away as a very slow inert gas purge was established into the reaction flask, up through the distillation head and condenser and out through the collection flask, which may have been cooled to facilitate collection of the alcohol. Alternately, or in conjunction with this method of alcohol removal, an inert solvent which formed an azeotrope with the alcohol, or which boiled slightly above the alcohol, could have been added to the reaction mixture and then distilled away.

Final product purification was as for Method 1. Except when undecenyl alcohol was reacted with diphenyl dimethoxy silane, the only purification was to distill away all low boiling compounds. R'ONa remained in the product.

A third general method was as follows:

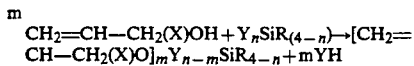

where n is an integer from 1 to 4, m is an integer, less than or equal to n, and from 1 to 3 and YH is a compound which boils at less than about 70° F.

Method 3 is very similar to Method 2; the main differences are that in Method 3 no catalytic sodium is required and YH is very volatile at room temperature and so heating is not required. Reaction mixtures were nevertheless generally heated in order to increase reaction rate and decrease solubility of YH. Heating was for 18 hours to a few days.

Y can be $Cl^-$ provided that the hydroxyl group in $R=OH$ (where $R=$ corresponds to $CH_2=CH-X-$ with X defined as above) is attached to an aromatic ring (otherwise yield will be low). In this case HCl is given off.

If Y is $NR''_2$, where R'' is a small alkyl group (1-3 carbons), YH is a low boiling amine.

Product purification was as for Method 1 but good results can be obtained without further purification.

PARADIGM OF METHOD 1 SYNTHESIS

3-Butenoxy Triethylsilane

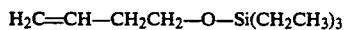

All operations were conducted under inert atmosphere using standard Schlenk and/or glove box techniques.

Into a 1.0 liter round bottom flask fitted with gas inlet, magnetic stirring bar and 125 ml gas inletted addition funnel, which apparatus had been assembled hot, evacuated and refilled with argon five times, were charged 24.88 g of 3-butenol (Aldrich, 0.34 mol), 27.01 g of pyridine (Aldrich, 0.34 mol) and 150 ml anhydrous, Argon purged, ether (Aldrich). To the addition funnel were added 50 g of chloro triethyl silane (Alfa, 0.34 mol) and 50 ml of anhydrous ether.

The 1.0 liter flask was cooled to 0° C. in an ice/water bath with magnetic stirring of its contents. After a short time slow addition of the chlorotriethylsilane solution was begun. White precipitate formed immediately. After addition was completed, the mixture was stirred an additional two hours at 0° C. It was then allowed to warm to room temperature overnight.

The solid pyridinium hydrochloride was separated from the solution by filtration. It was washed with about 100 ml of anhydrous ether.

The ether was removed from the filtrate by atmospheric pressure distillation. A purification was also effected by atmospheric pressure distillation. The materials which distilled below 186° C. were discarded as well as the first few ml of product that distilled at 186° C. Product was collected between 186° C. and 189° C. with the several ml of material remaining in distillation flask being discarded. Isolated yield was 37.03 g or 58% based on starting alcohol.

A second purification was effected by a vacuum distillation from triethylaluminum (TEA): A 100 ml round bottom gas inletted flask fitted with a short path distillation head and 50 ml collection flask was charged with 32.60 g of the product (3-butenoxy triethyl silane) and 5.0 ml of a TEA solution in heptane (Texas alkyls, 25.1 wt. %, density=0.715 g/ml). All product that was collected at a pressure of 5.0±0.25 mm Hg up to about 61° C. was discarded. Product was collected into a new collection flask at 63.0° C. at a pressure of 5.0±0.2 mm Hg. The total collected product weighed 23.59 g.

For the product expected to be 3-butenoxy triethyl silane, the following properties were obtained:

Boiling point: 186°-188° C.; P=1 atm. (uncorrected) 63.0° C.; P=5.0 ±0.2 mm Hg

Density (3 determinations): 0.86±0.02 g/ml.

$^{13}$Cnmr analysis subsequently confirmed the product as 3-butenoxy triethyl silane.

1, 2, 4, 5, 9, AND 11 MONOMER EXAMPLES

Method 1 was used to react 2-propenol, 3-butenol (detailed synthesis described above), 5-hexenol, and 7-octen-1,2-diol with various halo silanes. The solvent was ether. Specifics of the reactions are described in Tables 1 and 3.

MONOMER EXAMPLES 6 AND 8.

Hepta-1,6 dien-4-ol, and 10-undecenol were reacted with alkoxy silanes according to Method 2. Details are shown in Tables 2 and 3.

MONOMER EXAMPLES 7 AND 10.

2-Allylphenol and 2-methyl-3-buten-2-ol were silylated according to method 3. See Tables 2 and 3 for further elucidation.

MONOMER EXAMPLE 3.

Using standard inert atmosphere techniques 31.5 ml (0.15 mol) of dichloro diphenyl silane and 50 ml anhydrous ether were charged to a 500 ml round bottom, gas inletted, flask fitted with magnetic stirring bar and 125 ml addition funnel.

The addition funnel was charged with 15.5 ml of 4-pentenol (0.15 mol), 12.1 ml pyridine (0.15 mol) and about 97 ml of anhydrous ether. Dropwise addition of the alcohol/pyridine solution was begun to the vigorously stirred chloro silane solution. The temperature of the reaction flask was kept between 20° and 24° C. by a water bath. The reaction mixture was stirred for an additional three hours after the completion of the addition and then allowed to rest undisturbed.

The pyridinium hydrochloride was filtered off and washed with 100 ml and then 50 ml of ether. About 50 ml of the filtrate was removed via argon purge.

The collection flask was fitted with an additional flask which was purged with argon and then charged with 51 ml of a 3.0 molar ethyl magnesium bromide solution in ether (0.15 mol). This solution was added incrementally over about two hours to the vigorously stirred filtrate solution. Stirring was maintained for two hours more and then the reaction mixture was allowed to remain undisturbed overnight.

The resultant slurry was filtered. The solid on the frit was washed with about 75 ml of ether. Then the ether was vacuum stripped from the filtrate to leave an oily liquid in which a white solid was suspended. This product was slurried in about 100 ml of n-pentane and the resultant slurry was filtered. The pentane was vacuum stripped again leaving an oil in which there was a small amount of white solid suspended. This solid settled out in a few days.

Total isolated yield was 22 g which is about 49%. 1Hnmr spectra confirmed the nature of the product as 4-pentenoxy diphenyl ethyl silane.

Table 3 lists available rough density estimations.

TABLE 3

Aralkyl (and Aralkoxy) Siloxyaralkene Characteristics

| Compound (Example) | Boiling Point (°C.) | Pressure (mmHg) | Approximate density (g/ml) | Number of density determinations |
|---|---|---|---|---|
| 1 | 224–232<br>156 + 1<br>157 + 1 | 91 ± 1<br>6.3 ± 0.9<br>6 ± 1 | 1.07 ± .03 | 4 |
| 2 | 186–188<br>63.0 | 760<br>5.0 ± 0.2 | 0.86 ± 0.02 | 3 |
| 3 | — | — | 0.97 ± .07 | 2 |
| 4 | 165<br>79<br>74 | 760<br>45<br>39 | 0.85 ± 0.02 | 4 |
| 5 | 93.0 ± 0.9 | 29.9 ± 0.6 | 0.855 ± 0.019 | 10 |
| 6 | 130 + 1 | 8.7 | | |
| 7 | — | — | solid | — |
| 8 | 214 | 2.7 | solid | — |
| 9 | 242–244 | 760 | 0.851 ± 0.003 | 3 |
| 10 | — | — | 1.02 | 1 |
| 11 | 82 | 9.8 | 0.804 | 2 |

TABLE 1

Method 1 Syntheses

| Reactants | | Molar Ratio Silane/Aralkenol | Solvent Ratio of Wash Vol. to Rxn Vol. | Yield (%) Total Isolated | Distillation # | | Compound Name | Example # |
|---|---|---|---|---|---|---|---|---|
| Aralkenol | Silane | | | | #1 | #2 | | |
| Allylalcohol (2-Propenol) | Chloro diphenyl methyl silane | 0.92 | 0.3 | 82 | TEA VAC. | — | 2-Propenoxy diphenyl methyl silane | 1 |
| 3-Butenol | Chloro triethyl silane | 1.00 | 0.5 | 58 | —<br>760 mm | TEA VAC. | 3-Butenoxy triethyl silane | 2 |
| 5-Hexenol | Chloro trimethyl silane | 1.01 | 0.5 | 80 | —<br>760 mm | — | 5-Hexenoxy trimethyl silane | 4 |
| | | 1.00 | 0.5 | 66 | —<br>760 mm | TEA VAC. | 5-Hexenoxy trimethyl silane | 4 |
| 5-Hexenol | Chloro dimethyl ethyl silane | 0.95 | — | 73 | TEA VAC. | — | 5-Hexenoxy dimethyl ethyl silane | 5 |
| 7-Octen-1, 2-diol | Chloro trimethyl silane | 2.03 | 0.7 | — | —<br>760 mm | — | 1, 2-Di (trimethylsiloxy) 7-octene | 9 |
| 5-Hexenol | Chloro dimethyl isopropyl silane | 0.99 | — | 65 | VAC; TEA | — | 5-Hexenoxy dimethyl isopropyl silane | 11 |

TABLE 2

Methods 2 & 3 Syntheses

| Reactants | | Molar Ratio Silane/Aralkenol | Solvent | Na Aralkenol (mol/mol) | Nature of Y-H | Yield (%) | | Distillation | Compound Name | Example # |
|---|---|---|---|---|---|---|---|---|---|---|
| Aralkenol | Silane | | | | | Recovered ROH | Total Isolated | | | |
| Hepta-1,6-dien-4-ol | Ethoxy dimethyl phenyl silane | 0.98 | None | 0.01 | N.A. | 80 | — | vacuum | 4-(Dimethyl phenylsiloxy)-1,6-heptadiene | 6 |
| ω-Undecenyl alcohol (or 10-Undecenol) | Dimethoxy diphenyl silane | 1.00 | n-Heptane | 0.01 | N.A. | 85 | — | Not able | 10-Undecenoxy methoxy diphenyl silane | 8 |
| 2-Methyl-3-buten-2-ol | Tris (dimethyl amino) phenyl silane | 0.31 | None | N.A. | Dimethyl Amine | — | — | — | Tris-(2-Methyl-3-buten-2-oxy) phenyl silane | 10 |
| 2-Allylphenol | Chloro tribenzyl silane | 0.99 | Toluene | N.A. | HCl | — | Estimated as 70% Reaction Incomplete | — | 2-Allylphenoxy tribenzyl silane | 7 |

Thus it may be seen that we have prepared a class of compounds which are useful in making polymers for various purposes as recited elsewhere herein. Our invention includes the use to form copolymers-with lower olefins (ethylene and propylene) of compounds of the general formula $$[CH_2=CH-CH_2]_y(X)[O_w siR_{4-w}]_z$$

where (x), w, y and 2 are as explained elsewhere.

More specifically, our invention includes the polymerization of compounds of the general formula $$CH_2=CH-(CH_2)_n-O-SiR_3$$

where n is an integer from 2 to about 21 and each R is independently selected from alkyl, alkoxy, alkaryl and aryl groups having from 1 to about 20 carbon atoms, where the total carbons in all R groups is at least 5. Examples of compounds which may be present during polymerization include 2-propenoxy dimethyl phenyl silane, 2-propenoxy-diphenyl methyl silane, 2-propenoxy triisopropyl silane, and other compounds of the general formula $$CH_2=CH-CH_2-O-Si-RR'R''$$

wherein R is an isopropyl group and R' and R'' are independently selected from alkyl, alkoxy, alkaryl and aryl groups having from 1 to about 20 carbon atoms.

GENERAL COPOLYMERIZATION PROCEDURE

Case 1—One comonomer being gaseous

Standard inert atmosphere techniques were used to exclude moisture and oxygen throughout the manipulations recited below.

A round bottom flask fitted with a side arm, magnetic stirring bar and a stopper, which apparatus had been assembled hot from a drying oven and was then either evacuated and refilled with inert gas several times or (and) purged with the inert gas for at least 15 minutes, was charged with a given amount of solvent, heptane or toluene, usually 125 ml. The solvents were freshly distilled from sodium and triethyl aluminum (TEA) over which they had been refluxing for at least 18 hours under an inert atmosphere. Immediately after the solvent had been charged to the flask a given amount (see Tables A and B) of alkyl aluminum co-catalyst, which was in the form of a heptane solution of about 25 wt. % (0.715 g/ml in heptane), was also added to the flask which was then lowered into a thermostated oil bath and magnetic stirring was begun.

At this point the inert gas atmosphere in the flask was replaced with the gaseous comonomer by a minimum of 3 cycles of evacuation and refilling back to atmospheric pressure with the comonomer. After the third cycle the solution was stirred for at least 10 minutes (usually longer) to allow the solvent to become saturated with the comonomer. Pressure was maintained at about one atmosphere via a bubbler.

Next were added an "external donor", which usually was diphenyl dimethoxy silane or phenyl triethoxy silane, if one was being used, and the other comonomer. The polymerization was initiated by the addition of the transition metal containing co-catalyst, which was a titanium tetrachloride on a magnesium chloride support.

As the gaseous comonomer was consumed it was replaced by maintaining the pressure constant at one atmosphere via a bubbler.

After a specified period of time (see "run time" in Tables A and B) the reaction was quenched by the addition of acidified alcohol (HCl in iso-propanol, ethanol, and/or methanol). The quenched reaction slurry was combined with the alcohol solution of volume at least twice the original volume of the inert reaction solvent. The resultant slurry was stirred for at least 45 minutes and then filtered. This treatment not only stopped the reaction, it dissolved catalyst residues and removed the silyl groups and thus regenerated the hydroxyl groups.

If the filtration proceeded very slowly, the slurry was combined with enough water to make the filtration proceed at a convenient rate.

The polymer was resuspended in alcohol, stirred, filtered and vacuum dried overnight. Boiling heptane soluble content was determined by standard methods.

Some variations in the procedure were possible.

If the second comonomer was a solid, it was added as a solid or as a solution in the inert solvent.

If no solvent was used, the second comonomer was combined with the alkyl aluminum co-catalyst, and possibly other components excluding the transition metal containing co-catalyst, and this solution was saturated with the gaseous comonomer.

Case 2—Neither comonomer being gaseous

These polymerizations were run in essentially the same manner as the previous polymerizations. Since the comonomer was not a gas however the evacuation and refilling of the polymerization vessel with comonomer was unnecessary. The monomer was syringed (if it was a liquid or in solution) into the inert solvent prior to the alkyl aluminum addition. From this point on Case 2 polymerizations were identical to Case 1 polymerizations.

Details of all polymerizations are indicated in Table A. Compound numbers refer to the compounds made in the respective monomer syntheses examples 1-11; compound 12 is a commercial sample of O-trimethylsilylallyl alcohol. Table A-1 lists parameters of copolymerizations with propylene at a pressure of one (1) atmosphere. Table A-2 lists copolymerization parameters used with comohomers other than propylene. Gaseous monomers were held at 1 atmosphere; liquid monomers were employed at the indicated concentrations. All NMR results of homopolymers and copolymers indicated stereoregularity of the desilylated polymers.

Comparison Polymerizations

That the parent alkenols do not copolymerize under conditions comparable to those in which the finished protected monomers polymerize is demonstrated by attempted copolymerizations of propylene and unsilylated alcohols. Various copolymerizations were run to show the polymerization capabilities of this class of compounds. Details of the polymerizations are shown in Table B; results and polymer characteristics are shown in Table E. Allyl phenyl ether is employed in one attempt; its inability to polymerize demonstrates that the presence of an ether group alone is not sufficient to permit polymerization.

TABLE A-1

Polymerization Parameters - Copolymerizations with Propylene

| Aralkenoxysilane | | | Solvent | Ext. Donor | | Al. Cocat. | | Trans Metal Cocat. | | Run Time | Temp. |
|---|---|---|---|---|---|---|---|---|---|---|---|
| # Cmpd. | Run | Conc. (M) | Name | Name | Conc. (M) | Nme | Conc. (M) | Name | Wght (mg) | (hrs) | (°C.) |
| 1 | 198 | 2.13 | — | DPMS | 0.019 | TEA | 0.75 | FT-1-SS | 1063 | 6 days | 20 |
|   | 213 | .4 | nC$_7$ | DPMS | .003 | TEA | .06 | FT-1-SS | 513 | 4 | 55 |
|   | 215 | 0.85 | nC$_7$ (17) | DPMS | 0.009 | TEA | 0.46 | FT-1-SS | 1033 | 25 | 60 |
| 2 | 160 | 3.43 / 2.72 | — | — | — | TEA | 0.40 / 0.64 | FT-1-SS | 298 / 879 | 2 / 2 | 55 |
|   | 226 | 0.20 | nC$_7$ | — | — | DEAC | 0.11 | TiCl$_3$ | 472 | 4 | 50 |
| 3 | 162 | 2.58 | — | — | — | TEA | 0.39 | FT-1-SS | 667 | 3 | 60 |
|   | 218 | 0.13 | nC$_7$ | DPMS | 0.006 | TEA | 0.11 | FT-1-SS | 271 | 2 | 50 |
| 4 | 125 | 0.05 | nC$_7$ (300) | — | — | TEA | 0.26 | FT-1-SS | 1080 | "24" | 20 |
|   | 126 | 0.29 | — | — | — | TEA | 1.50 | FT-1-SS | 294 | "24" | 20 |
| 4 | 128 | 2.06 / 1.32 | nC$_7$ / 10 | — | — | TEA | 0.88 / 0.57 | FT-1-SS | 510 | 0.5 / 1 | 20 |
|   | 144 | 0.40 | tol (100) | — | — | TEA | 0.069 | FT-1-SS | 500 | 3 | 50 |
|   | 145 | 0.40 | tol (100) | PES | .0034 | TEA | 0.069 | FT-1-SS | 950 | 3 | 50 |
|   | 146 | 0.73 | tol (100) | PES | .0124 | TEA 0.063 | FT-1-SS 850 | | | 3 | 70 |
|   | 245 | 0.117 | nC$_7$ | DPMS | .0030 | TEA | 0.059 | FT-1-SS | 258 | 2 | 50 |
|   | 246 | 0.324 | nC$_7$ | DPMS | .0080 | TEA | 0.156 | FT-1-SS | 185 | 2 | 55 |
|   | 251 | 0.314 | nC$_7$ | DPMS / Et$_2$N—SiMe$_3$ | .0079 / .0157 | TEA | 0.155 | FT-1-SS | 287 | 2 | 50 |
|   | 253 | 0.368 | nC$_7$ (50) | DPMS | .0167 | TEA | 0.311 | FT-1-SS | 254 | 2 | 55 |
| 5 | 247 | 0.117 | nC$_7$ | DPMS | .0030 | TEA | 0.058 | FT-1-SS | 266 | 2 | 55 |
|   | 248 | 0.317 | nC$_7$ | DPMS | .0079 | TEA | 0.155 | FT-1-SS | 253 | 2 | 55 |
|   | 252 | 0.318 | nC$_7$ | DPMS / Et$_2$N—SiMe$_3$ | .0079 / .0156 | TEA | 0.154 | FT-1-SS | 202 | 2 | 50 |
|   | 254 | 0.635 | nC$_7$ (50) | DPMS | .0157 | TEA | 0.308 | FT-1-SS | 266 | 2 | 50 |
| 6 | 243 | 0.123 | nC$_7$ | PES | .0031 | TEA | 0.060 | FT-1-SS | 234 | 2 | 50 |
|   | 244 | 0.232 | nC$_7$ | PES | .0058 | TEA | 0.112 | FT-1-SS | 238 | 2 | 50 |
| 7 | 236 | 0.17 | tol (90) | DPMS | .01 | TEA | 0.12 | FT-1-SS | 1117 | 2 | 50 |
|   | 237 | 0.13 | tol (175) | DPMS | .01 | TEA | 0.13 | FT-1-SS | 1070 | 2 | 50 |
| 8 | 220 | 0.35 | tol | — | — | TEA | 0.13 | FT-1-SS | 216 | 2 | 50 |
|   | 227 | 0.29 / 0.27 | tol | — | — | DEAC | 0.05 / 0.12 | TiCl$_3$ | 606 | 2 / 2 | 55 |
|   | 228 | 1.01 | tol (40) | — | — | TEA | 0.41 | FT-1-SS | 1425 | 2 | 55 |
| 9 | 169 | 0.389 | tol (100) | DPMS | .0069 | TEA | 0.065 | GF2A | 456 | 3 | 70 |
|   | 175 | 2.46 | — | DPMS | .0269 | TEA | 0.253 | FT-1-SS | 813 | 3 | 60 |
|   | 223 | 0.109 | nC$_7$ | PES | .0030 | TEA | 0.059 | FT-1-SS | 305 | 2 | 55 |
| 10 | 250 | 0.116 | nC$_7$ | DPMS | .0031 | TEA | 0.060 | FT-1-SS | 270 | 2 | 55 |
| 11 | 277 | 0.125 | nC$_7$ | DPMS | .0030 | TEA | 0.058 | FT-1-SS | 323 | 2 | 50 |
|   | 278 | 0.344 | nC$_7$ | DPMS | .0028 | TEA | 0.055 | FT-1-SS | 366 | 2 | 50 |
|   | 279 | 0.694 | nC$_7$ (50) | DPMS | .0061 | TEA | 0.119 | FT-1-SS | 360 | 2 | 50 |
|   | 280 | 0.359 | nC$_7$ | DPMS / Et$_2$N—SiMe$_3$ | .0028 / .0054 | TEA | 0.055 | FT-1-SS | 296 | 2 | 50 |
| 12 | 241 | 0.118 | nC$_7$ | DPMS | .0030 | TEA | 0.059 | FT-1-SS | 469 | 2 | 50 |

TABLE A-2

Polymerization Parameters ($M_2 \neq C_3^=$)
Copolymerizations with Comonomers other than Propylene

| Aralkenoxysilane | | | Comonomer | | Solvent | | Ext. Donor | | Al. Cocat. | | Trans Metal Cocat. | | Run Time | Temp. |
|---|---|---|---|---|---|---|---|---|---|---|---|---|---|---|
| # Cmpd. | Run | Conc. (M) | Name | Conc. (M) | Name | | Name | Conc. (M) | Name | Conc. (M) | Name | Wght (mg) | (hrs) | (°C.) |
| 5 | 274 | 0.384 | C$_2^=$ | 1 atm. | nC$_7$ | (100) | — | — | TEA | 0.13 | FT-1-SS | 1271 | 2 | 55 |
| 9 | 233 | 0.240 | C$_6^=$ | 1.42 | nC$_7$ | (100) | DPMS | .0029 | TEA | 0.056 | FT-1-SS | 282 | 2 | 50 |
| 11 | 281 | 0.303 | C$_6^=$ | 0.290 | nC$_7$ | | DPMS | .0028 | TEA | 0.054 | FT-1-SS | 261 | 4 | 50 |
| 5 | 270 | 0.124 | C$_8^=$ | 2.29 | nC$_7$ | (75) | PES | .0031 | TEA | 0.060 | FT-1-SS | 254 | 3 | 50 |
| None | 273 | — | C$_2^=$ | 1 atm. | nC$_7$ | (100) | — | — | TEA | 0.141 | FT-1-SS | 1952 | 2 | 60 |
| None | 219 | — | C$_6^=$ | 1.67 | nC$_7$ | (100) | DPMS | .0032 | TEA | 0.062 | FT-1-SS | 594 | 2 | 55 |
| None | 269 | — | C$_8^=$ | 2.35 | nC$_7$ | (75) | PES | .0031 | TEA | 0.061 | FT-1-SS | 254 | 3 | 50 |

TABLE A-3

Homopolymerization Parameters

| Aralkenoxysilane | | | Solvent | Ext. Donor | | Al. Cocat. | | Trans Metal Cocat. | | Run Time | Temp. |
|---|---|---|---|---|---|---|---|---|---|---|---|
| # Compd. | Run | Conc. (M) | Name | Name | Conc. (M) | Name | Conc. (M) | Name | Wght (mg) | (hrs) | (°C.) |
| 1 | 197 | 208 | — | DPMS | 0.019 | TEA | 0.73 | FT-1-SS | 1024 | 4 days | 26 |

TABLE A-3-continued

Homopolymerization Parameters

| Aralkenoxysilane | | | Solvent | Ext. Donor | | Al. Cocat. | | Trans Metal Cocat. | | Run Time | Temp. |
|---|---|---|---|---|---|---|---|---|---|---|---|
| # Compd. | Run | Conc. (M) | Name | Name | Conc. (M) | Name | Conc. (M) | Name | Wght (mg) | (hrs) | (°C.) |
|  | 214 | 1.91 | — | — | — | TEA | 0.88 | FT-1-SS | 1481 | 15 days | 60 |
| 2 | 159 | 1.58 | — | — | — | TEA | 1.05 | FT-1-SS | 1469 | 3 days | 20 |
|  | 11153-027 | 2 | — | — | — | TEA | .8 | FT-1-SS | 373 | 3.5 | 75 |
| 3 | 11153-022 | 1.09 | — | — | — | TEA | 1.05 | FT-1-SS | 327 | 2 | 20 |
| 4 | 117 | 0.42 | — | — | — | TEA | 1.45 | FT-1-SS | 989 | 6 days | 20 |
|  | 118 | 0.42 | — | — | — | TEA | 1.45 | FT-1-SS | 893 | 7 days | 20 |
|  | 134 | 2.88 / 1.64 | nC$_7$ (0/10) | — | — | TEA | 1.20 / 0.69 | FT-1-SS | 156 | 1/3 | 20 |
|  | 135 | 0.71 | nC$_7$ (40) | — | — | TEA | 0.15 | FT-1-SS | 150 | 5 days | 20 |
| 4 | 136 | 2.43 / 1.61 / 1.20 / 0.96 | — | — | — | TEA | 0.81 / 1.07 / 1.20 / 1.28 | FT-1-SS | 101 | 2 / 16 / 8 / 18 | 20 |
| 8 | 229 | 0.54 | tol (85) | — | — | TEA | 0.24 | FT-1-SS | 1936 | 3 days | 55 |
| 9 | 170 | 0.725 | tol (25) | — | — | TEA | 0.198 | FT-1-SS | 1108 | 18 | 20 |
| 7 | 238 | 0.31 | tol (25) | DPMS | .03 | TEA | 0.53 | FT-1-SS | 1406 | 5 days | 85 |

TABLE B

Polymerization Parameters

| | Monomer | | | Ext. Donor | | Al. Cocat. | | Trans Metal Cocat. | | Run Time | Temp. |
|---|---|---|---|---|---|---|---|---|---|---|---|
| Run # | Name | Conc. (M) | Solvent Name | Name | Conc. (M) | Name | Conc. (M) | Name | Wght (mg) | (hrs) | (°C.) |
| 310 | allylalcohol | 0.123 | nC$_7$ | DPMS | .0030 | TEA | 0.059 | FT-1-SS | 436 | 2 | 50 |
| 234 | 2-Allyl phenol | 0.268 | nC$_7$ (50) | DPMS | .007 | TEA | 0.137 | FT-1-SS | 262 | 2 | 50 |
| 232 | Allyl phenyl ether | 0.656 | nC$_7$ (100) | DPMS | .0035 | TEA | 0.068 | FT-1-SS | 376 | 2 | 50 |
| 239 | 4-Pentenol | 0.114 | nC$_7$ | DPMS | .0030 | TEA | 0.059 | FT-1-SS | 234 | 2 | 50 |

TABLE C

RESULTS OF COPOLYMERIZATIONS WITH PROPYLENE ($M_2$ = Propylene)

| Run # | $M_1$ | Composition Mole fraction $M_1$ | Wt. fraction $M_1$ | Method | Yield g/g cat | Boiling Heptane Insol. (%) | $T_m$ (°C.) | $T_c$ (°C.) | $M_w$/ × 1000 | $M_n$/ × 1000 | $M_w$/$M_n$ |
|---|---|---|---|---|---|---|---|---|---|---|---|
| 198 | 1 | | | | Run Abandoned | | | | | | |
| 213 | " | 0.020 | 0.028 | El.Anal | 7.5 | 91.9 | | | 398 | 66.2 | 6.01 |
| 215 | " | <.01 | | EA | 2.0 | | | | 162 | 16.5 | 9.80 |
| 160 | 2 | 0.045 | 0.072 | NMR | | | | | | | |
|  |  | 0.030 | 0.053 | EA | 1.5 | 76.8 | 150.5 | 111.5 | * | | |
| 226 | " | 0.033 | 0.055 | EA | 20.5 | 76.8 | | | 27.1 | 5.33 | 5.09 |
| 162 | 3 | not fully deprotected | | NMR | 9.2 | 16.4 | 68 146 | 91 65 | 133 | 24.2 | 5.48 |
| 218 | " | 0.034 | 0.068 | EA | 130 | 96.8 | | | 336 | 46.6 | 7.22 |
| 125 | 4 | 0.022 | 0.051 | EA | 27.9 | 91.1 | | | | | |
| 126 | " | Trace | | NMR | | | | | | | |
|  |  | 0.010 | 0.024 | EA | 60.7 | 80.2 | | | | | |
| 128 | " | 0.056 | 0.125 | NMR | | | | | | | |
|  |  | 0.049 | 0.110 | EA | 19.6 | 88.1 | 149.8 | 107.9 | 533 | 30.1 | 17.7 |
| 144 | " | 0.042 | 0.094 | EA | 12 | 55.9 | | | 168 | 33.1 | 5.07 |
| 145 | " | 0.034 | 0.078 | EA | 16 | 92.1 | | | 581 | 72.5 | 8.01 |
| 146 | " | 0.061 | 0.134 | EA | >3 | 71.9 | | | 385 | 51.9 | 7.41 |
| 245 | " | 0.018 | 0.043 | EA | 60.3 | 95.9 | | | | | |
| 246 | " | 0.146 | 0.289 | EA | 22.5 | 86.8 | | | | | |
| 251 | " | 0.037 | 0.084 | EA | 62.7 | 94.5 | | | | | |
| 253 | " | 0.068 | 0.147 | EA | 36.6 | 93.7 | | | | | |
| 271 | 5 | — | — | — | 14.5 | 96.1 | | | | | |
| 247 | " | 0.025 | 0.058 | EA | 104 | 97.8 | | | | | |
| 248 | " | 0.057 | 0.126 | EA | 84.5 | 91.1 | | | | | |
| 252 | " | 0.019 | 0.044 | EA | 95.1 | 97.3 | | | | | |
| 254 | " | 0.142 | 0.283 | EA | 19.0 | 95.4 | | | | | |
| 261 | " | 0.033 | 0.076 | EA | 78.7 | 97.1 | | | | | |
| 262 | " | 0.017 | 0.040 | EA | 101 | 97.8 | | | | | |
| 243 | 6 | 0.096 | 0.221 | EA | 73.8 | 63.2 | 142.3 | 106.4 | | | |
| 244 | " | <.01 | | NMR | | | | | | | |
|  |  | 0.070 | 0.167 | EA | 67.3 | 69.3 | 161.7 | 117.2 | | | |
| 282 | " | 0.009–0.013 | 0.025–0.035 | EA | 7.3 | 35.6 | | | | | |
| 236 | 7 | <.01 | — | NMR | | | | | | | |

TABLE C-continued

| | | <.08 | <.21 | EA | 47.7 | 98.7 | | | | |
|---|---|---|---|---|---|---|---|---|---|---|
| 237 | " | 0.002–0.014 | 0.006–0.031 | EA | 55.4 | 93.6 | 158.9 | 115.4 | | |
| 220 | 8 | 0.013 | 0.053 | EA | 147 | 94.2 | 158.0 | 114.7 | 278 | 30.2 | 7.27 |
| 227 | " | 0.024 | 0.091 | EA | 10.3 | 83.8 | 150.7 | 110.9 | 76.4 | 15.7 | 4.06 |
| 228 | " | 0.022 | 0.084 | EA | 21.5 | 72.0 | 147.9 | 112.8 | 146 | 14.9 | 9.79 |
| 169 | 9 | <.01 | | NMR | | | | | | | |
| | | 0.015 | 0.050 | EA | 14.9 | 84.8 | 157 | 112.7 | 323 | 58.5 | 5.54 |
| 175 | " | 0.046 | 0.142 | NMR | | | | | | | |
| | | 0.049 | 0.151 | EA | 3.8 | 91.2 | 152.4 | 113.6 | * | | |
| 223 | " | 0.011 | 0.037 | EA | 52.2 | 93.1 | 154.8 | 110.6 | 177 | 16.3 | 10.8 |
| 250** | 10 | <.01 | | NMR | | | | | | | |
| | | 0.031 | 0.062 | EA | 146 | 96.2 | 162.1 | 117.7 | | | |
| 277 | 11 | 0.014 | 0.032 | EA | 114 | 96.7 | | | | | |
| 278 | " | 0.052 | 0.116 | EA | 62.4 | 93.0 | | | | | |
| 279 | | — | — | — | 17.5 | 95.8 | | | | | |
| 280 | " | — | — | — | 77.3 | 95.3 | | | | | |
| 241 | 12 | 0.046 | 0.062 | EA | 1.5 | — | — | — | — | — | — |

RESULTS OF COPOLYMERIZATIONS WITH COMONOMERS OTHER THAN PROPYLENE ($M_2 \neq C_3^=$)

| | | | Composition | | | Yield | Boiling Heptane |
|---|---|---|---|---|---|---|---|
| Run # | $M_1$ | $M_2$ | Mole fraction $M_1$ | Wt. fraction $M_1$ | Method | g/g cat or [%] | Insol. (%) |
| 274 | 5 | $C_2^=$ | .005–.024 | .017–0.082 | El.Anal. | 16 | 98.1 |
| 273 | None | " | NA | NA | NA | 11 | 94.0 |
| 233 | 9 | $C_6^=$ | 0.103 | 0.164 | El.Anal. | [28] | — |
| 281 | 11 | " | 0.369–0.426 0.40 | 0.410–0.494 0.44 | El.Anal.; NMR | [57] | — |
| 219 | None | " | NA | NA | NA | [55] | — |
| 270 | 5 | $C_8^=$ | 0.025–0.200 | 0.022–0.182 | El.Anal. | [76] | — |
| 269 | None | " | NA | NA | NA | [91] | — |

**Incorporation of the silylated monomer was apparently very minute.

TABLE D
HOMOPOLYMERIZATION YIELDS

| Run # | Monomer | Unoptimized Isolated Yield (%) |
|---|---|---|
| 197 | 1 | 10 |
| 214 | " | 10 |
| 159 | 2 | 22 |
| 11153-027 | " | — |
| 11153-022 | 3 | ~90 |
| 117 | 4 | 5 |
| 118 | " | 2 |
| 134 | " | 13 |
| 135 | " | 10 |
| 136 | " | 17 |
| 238 | 7 | — |
| 229 | 8 | 20 |
| 170 | 9 | 6 |

TABLE E
COMPARISON COPOLYMERIZATIONS WITH PROPYLENE ($M_2$ = Propylene)

| Run # | Unprotected Monomer ($M_1$) | Yield g/g cat | Mole Frac. | Wgt. Frac. |
|---|---|---|---|---|
| 310 | allylalcohol | 0 | — | — |
| 234 | 2-allyl phenol | 0 | — | — |
| 232 | allyl phenyl ether | 0 | — | — |
| 239 | 4-Penentol | 0 | — | — |

Key for Tables
M — molar = moles/liter
cmpd # — correspond to example #'s in previous section
DPMS — diphenyl dimethoxy silane
$C_2$ — ethylene
$C_3$ — propylene or —$C_3$ olefin
$C_6$ — 1-hexene or —$C_6$ olefin
$C_8$ — octene-1
$nC_7$ — n-heptane or $C_7$ alkane (normal isomer)

TABLE E-continued
COMPARISON COPOLYMERIZATIONS WITH PROPYLENE ($M_2$ = Propylene)

tol — toluene
$M_1$ — comonomer #1
$M_2$ — comonomer #2
$T_m$ — melting temp.
$T_c$ — crystalliation temp.
$M_w$, $M_n$ — weight, number average mol. weights, respectively.
FT1-SS — A titanium catalyst supported on magnesium choride, available commercially from Himont Inc.
GF2A — A titanium catalyst supported on magnesium choride, available commercially from Himont Inc.
* — not soluble
DEAC — diethyl aluminum chloride
PES — phenyltriethoxy silane
TEA — triethyl aluminum
$Et_2NSiMe_3$ — diethylaminotrimethyl silane It will be seen from the foregoing data that there are at least two significant factors in the application of the principles of our invention. First, there should be a total of at least five carbon atoms in the protecting groups bonded to each silicon, and the carbon immediately bound to the oxygen so to protect the oxygen to which it is bonded. Second, there should be at least two carbon atoms between the unsaturated group and the oxygen.

In addition, it will be observed that the silylated monomer functions not only as a monomer but also as a catalyst modifier, resulting in an enhancement of stereoregularity, even in the absence of added modifier.

Traditionally, unsupported catalysts such a $TiCl_3$/DEAC function without other system components. For homopolymerization of alpha-olefins the supported catalysts (e.g. FT-1-SS/TEA) require a third component or modifier. An optimal example is an alkoxy silane. This component has a beneficial effect on catalyst performance as can be seen by comparing runs 86 and 87 in Table F below with runs 85, 164 and 166. Yield increases and the amount of stereoregular material increases also. The modifier should be used in the proper amount, however, because too much will poison the catalyst: Compare runs 85, 164 and 166 with 191 where a 50% loss of activity occurred from excessive silane (Al/PES=0.5). With excessive amounts of silane there is also a large increase in the amount of material insoluble in boiling heptane. In the examples just cited the tII (total isotactic index) goes from 97% to essentially 100%. Such a polypropylene (tII=100%) is limited in use because it is too brittle for most applications. Even the soluble fractions (extracted with boiling heptane) of runs 125, 126 and 128 (Table A-1) were significantly stereoregular, i.e. 55%, 60%, and 71% of the triads contained methyl groups all on the same side. A result of 81% was obtained on run 160.

This behavior contrasts with the homogeneous (or unsupported) catalysts which generally were not designed to operate in the presence of "modifiers" such as silanes. These materials tend to behave as poisons and have a generally deleterious effect upon catalyst performance. The deleterious effect of silyl ethers (alkoxy silanes and alkenoxy silanes) is exemplified by the data in Table G1 below. Comparing runs 188 and 187 shows that even small amounts of PES, a "required" component for catalysts such as FT-1-SS, reduces activity by 50% and does not improve the stereoregularity of the resultant polymer. With these catalysts alkoxy silane types of materials are only poisons which can be mollified or at best made inoffensive. They certainly are not required components.

sembles an (alpha)-olefin, the greater the opportunity for it to polymerize at the same centers that are active for olefins."

When used with the latest generations of supported catalysts the behavior we have found for our alkenoxy silanes, even when they are present in large amounts, is that they have a beneficial effect, on the stereoregularity (which improves, often even over that obtained with PES, but does not become excessive), without excessive reductions in activity. In fact there is no need to explicitly add a traditional "modifier" to obtain a stereoregular product. See Table F, run 247 where a 15% loss of activity is seen in the presence of a large amount of silane yet the tII (total isotactic index) value is comparable to polymer from a PES modified run. In fact the tII is 0.7% better.

This behavior contrasts strongly with what is seen with $TiCl_3$. In Table G1 we see run 271 was made with the same alkenoxy silane. The result was a 60% loss of activity and no improvement in the tII. Clearly this alkoxy silane is still too much like an alkoxy silane to be tolerated by this type of catalyst.

The contrast seems to be between a tolerable poison in one system and a necessary component that imparts additional properties in the other system.

Table F also shows that while there is variation in the activity it is clear that the isotactic index is higher in the copolymerizations (which are performed without any added modifier per se only the added comonomer) than in the homopolymerizations run without any modifier. The comonomer is providing among other things the

TABLE G1

EFFECT OF SILANES ON PROPYLENE POLYMERIZATION USING UNSUPPORTED CATALYSTS - $TiCl_3$ (Stauffer 1.13)

| Run | TiCl3 conc mg/ml | Silane name | mm/l | DEAC conc mm/l | Al/Si Ratio m/m | Run time h | Activity g/g c | g/g h | Norm | tII % |
|---|---|---|---|---|---|---|---|---|---|---|
| 188 | 2.4 | none | NA | 61 | NA | 2 | 40.6 | 20.3 | 1.00 | 96.0 |
| 187 | 2.5 | PES | 3 | 61 | 20 | 2 | 21.3 | 10.7 | 0.53 | 95.5 |
| 228 | 4.3 | Butenoxy Triethyl | 200 | 110 | 0.6 | 4 | 20.5 | 5.1 | 0.25 | 76.8 |
| 271 | 2.1 | Hexenoxy Ethyl Dimethyl | 120 | 59 | 0.5 | 2 | 14.5 | 7.3 | 0.36 | 96.1 |

Types of alkoxy silanes can be found which have been so constructed so that the Si—O—C linkage is shielded from any, or most, interaction with the catalytic centers. The result of efforts like this in effect produce a silyl ether which is as far away as possible from a silyl ether. In fact we have Boor's words (after Giannini) "The more closely the polar compound re-function of a modifier. For comparison consider that copolymerizations with 1-hexene and 1-octene gave isotacticities between 36 and 86%. Also, it can be seen that activity and isotactic index, in the modifierless homopolymerizations seem to vary a great deal in some way with the TEA concentration while in the copolymerizations this variation is apparently absent.

TABLE F

EFFECT OF SILANES IN PROPYLENE POLYMERIZATION USING LATEST GENERATION SUPPORTED CATALYSTS - FT-1SS

| Run* | FT-1-SS conc mg/ml | Silane name | mm/l | TEA conc mm/l | Al/Si Ratio m/m | Activity g/g/ c | g/g h | Norm | tII % |
|---|---|---|---|---|---|---|---|---|---|
| 086 | 1.3 | none | NA | 35 | NA | 118 | 59 | 1 | 70.1 |
| 087 | 0.8 | none | NA | 35 | NA | 124 | 62 | 1 | 52.2 |
| 414 | 1.2 | none | NA | 61 | NA | 172 | 86 | 1.41 | 81.5 |
| 424 | | none | NA | 61 | NA | 260 | 130 | | 82.4 |
| 456 | | none | NA | 180 | NA | 131 | 66 | | 72.5 |
| 457 | | none | NA | 600 | NA | 114 | 57 | | 70.2 |
| 085 | 1.2 | PES | 2 | 34 | 20 | 130 | 65 | 1.07 | 97.2 |
| 164 | 0.6 | PES | 3 | 61 | 20 | 133 | 67 | 1.10 | 97.0 |
| 166 | 0.9 | PES | 3 | 61 | 20 | 140 | 70 | 1.15 | 97.1 |
| 191 | 1.2 | PES | 120 | 59 | 0.5 | 70 | 35 | 0.57 | 99.9 |
| 247 | 2.0 | Hexenoxy Ethyl | 120 | 58 | 0.5 | 104 | 52 | 0.85 | 97.8 |

TABLE F-continued

EFFECT OF SILANES IN PROPYLENE POLYMERIZATION
USING LATEST GENERATION SUPPORTED CATALYSTS - FT-1SS

| Run* | FT-1-SS conc mg/ml | Silane name | conc mm/l | TEA conc mm/l | Al/Si Ratio m/m | Activity g/g/c | g/g h | Norm | tII % |
|---|---|---|---|---|---|---|---|---|---|
| 415 | | Dimethyl Pentenoxy Triethyl | 126 | 59 | 0.5 | 114 | 57 | | 96.1 |
| 418 | | Pentenoxy Triethyl | 124 | 30 | 0.2 | 118 | 59 | | 96.6 |
| 419 | | Pentenoxy Triethyl | 360 | 185 | 0.5 | 82 | 41 | | 96.6 |

*Run Time 2 hours in all cases.

From the point of view of the tII (total isotactic index) runs 456 and 419 are the most similar because of the high TEA concentrations. Thus, looking at Table G2 below we can see just how effective these comonomers are at improving the stereoregularity of the polymer produced. The table contains an NMR analysis of the whole polymer, the insoluble in boiling heptane fraction, and the fraction soluble in boiling heptane (the solvent used to measure the tII). From the table it can be seen that not only is the "as formed" polymer more stereoregular (mm (isotactic dyad) content 95 vs. 79%) than the homopolymer, but even that fraction which is soluble in the boiling heptane (the nominally atactic fraction) is more highly stereoregular (mm dyad content 67 vs. 62%). These results confirm the conclusions obtained from the extraction data.

TABLE G2

| | NMR ANALYSIS FOR ISOTACTICITY | | | | |
|---|---|---|---|---|---|
| RUN # | | FRACTION | mm % | mr % | rr % |
| 424 | h | whole | 90 | 5 | 5 |
| | o | insoluble | 86 | 7 | 7 |
| | m | soluble | 59 | 17 | 24 |
| | o | | | | |
| 456 | p | whole | 79 | 13 | 8 |
| | p | insoluble | 89 | 10 | — |
| | | soluble | 62 | 21 | 17 |
| 419 | c | whole | 95 | 3 | 2 |
| | o | insoluble | 83 | 14 | 3 |
| | p | soluble | 67 | 15 | 18 |

Thus it may be seen that our invention includes methods of making polymers comprising polymerizing, in the presence of a Ziegler-Natta catalyst, preferably a titanium chloride catalyst on a magnesium chloride support, monomers including a monomer containing at least one group of the formula—OSiR$_3$ wherein each R is independently selected from alkyl, alicyclic, alkoxy, alkaryl and aryl groups having from 1 to 20 carbon atoms and the total of carbon atoms in the R groups is at least 5. It also includes the hydrolysis or alcoholysis of such polymers to obtain functional polymers. The polymers may be homopolymers derived from the —OSiR$_3$ containing monomers, or may have a ratio of copolymerizable monomers to such monomers as high as 10,000 or higher. After hydrolyzing the silyl-containing polymers, the protective silyl groups may be recovered for recycling.

Adhesion to Metals

About 0.5 g of copolyhexenol/propene (Run#128, containing about 12% hexenol by weight) was placed between two pieces of aluminum foil. This sandwich was placed between the heated platens (about 380° F.) of a hydraulic press. The press was closed with a few pounds of pressure for about 0.5 minute. The pressure was increased to 30,000 psig for about 2.5 minutes at 380° F. Pressure was released; the sandwich was recovered and cooled to room temperature. The aluminum foil could not mechanically be removed from the film of copolymer except with much damage to the copolymer film. In order to remove the metal, it had to be digested away with caustic solution.

Homopolypropylene when pressed in this manner easily separated intact from the metal foil.

In additional tests, the exact methodology of the previous test was not duplicated. Previously, a brass template/spacer was used to obtain films of polymers. This time the polymer was placed directly on the aluminum foil sheets without any template or spacer. The aluminum foil was arranged so that one dull face and one shiny face contacted the polymer. Other than this the tests were the same as described above.

Polymers from the following runs were sampled and used:

277—1% hexenol from iso-propyl dimethyl siloxy hexane;

278—5% hexenol from iso-propyl dimethyl siloxy hexane;

226—1% 7-octene-1,2-diol from 1,2-di(trimethylsiloxy)-7-octene; and,

299—sample of homopolypropylene.

The polypropylene (#299) detached cleanly from both faces of the aluminum foil. The film was thin and so there was some tearing but all the polymer was easily separated from the foil.

Polymer from run #278 could not be separated from the dull side. Only about half was able to be removed from the shiny side and that was accompanied by much damage to the foil. This result parallels that previously found. Run #277 easily detached from the dull side and with moderate damage from the shiny side.

Polymer from run #226 was extruded almost completely from between the foil sheets. No meaningful result could be obtained.

Polymer from run #223 stuck equally tenaciously-to both dull and shiny sides. Separation was accompanied by much damage to both film and foil and even then was not complete.

Oxidation of Polymer Films

Films were made from (1) hexenol/propene copolymer (Run #128) and (2) homopolypropylene produced under conditions of Run #128 except in the absence of comonomer. The films were made by compression of the polymer materials between Mylar sheets. While the resulting copolymer film adhered to the Mylar, it separated relatively easily after return to room temperature. These films were flexible and transparent.

The films were suspended in toluene saturated with Jones reagent (8N chromic acid—$H_2CrO_4$) at about 50° C. for 16 hours. They were then washed with fresh toluene. The copolymer film was slightly discolored (brownish) and was slightly less transparent than it was originally. Its flexibility and ease of tearing were unchanged by the Jones reagent. The homopolymer film was definitely more discolored (brownish). It was more translucent than transparent. But the most noticeable change was a complete loss of flexibility. It had become very brittle.

Apparently, the presence of the alcohol had an antioxidant effect at least with regard to the mechanical properties of the polymer film. While we do not intend to be bound by any theories, we believe the presence of the hydroxyl groups at the ends of the short branches tends to dissipate the ability of an oxidizing agent to attack the "backbone" structure of the polymer.

IR of the polypropylene film showed three peaks in the carbonyl stretch region: about 1628 $cm^{-1}$ medium, broad; about 1720 $cm^{-1}$ medium, sharp; about 1775 weak shoulder. The most prominent feature of the carbonyl stretch region of the copolymer IR was a strong sharp band at about 1735 $cm^{-1}$. A weak broad band at about 1635 $cm^{-1}$ and two weak shoulders at about 1710 and about 1775 $cm^{-1}$ correspond to the similar bands in the polypropylene spectrum. Both spectra have bands in the O—H stretch region but the copolymer displays a stronger, sharper band. Not all of the alcohol groups were oxidized as is shown by absorption in the 1050 $cm^{-1}$ region of the copolymer IR: this is the $CH_2$—OH stretch region.

A similar experiment with film from run 226 resulted in a very flexible copolymer film contrasted with an extremely brittle homopolymer film.

DYEING OF POLYMER POWDERS

Hexenol/propene copolymer—Basic Red 1

To a dye bath composed of 0.18 g of Rhodamine 6G (Basic Red 1—C.I. 45160), 6.52 g n-butanol, 57.4 g water was added, a sample of polymer resulting from Run #128 (alcohol monomer content about 5% mole) which weighed 0.56 g. The mixture was refluxed for 4 hours, after which time the solid was collected by filtration and it was exhaustively sequentially washed with the following: warm water/butanol with detergent; warm water with detergent; warm water; and warm water. The solid was air dried on a frit for about 10 minutes and then vacuum dried overnight. A deep pink colored solid resulted.

Polypropylene—Basic Red 1

An identical treatment of a sample of a homopolypropylene was made. The polymer was made under conditions identical to Run #128 except no comonomer was used. A distinctly less colored polymer powder resulted. The pickup of any color at all was attributed to the high ash content resulting from acidic catalyst residues. In a later preparation, prewashing the homopolymer sequentially with acidic, neutral, basic and neutral water solutions resulted in a much less intensely colored pinkish solid. Similar prewashing of the copolymer only slightly reduced the coloration of the resulting solid. The copolymer was presumed to have been intrinsically dyed.

Following are additional studies and results specifically on the incorporation of propenol comonomer into propylene polymer.

EXPERIMENTAL METHODS

The following describes experimental methods and procedures for testing.

Pressing of Films (Applicable for films used in IR analysis, colorant affinity tests, water absorption tests, and metal adhesion studies.)
1. Approximately ½-gram of polymer powder was pressed between sheets of Mylar film;
2. this sandwich in turn was placed between flat metal plates and heated in clamped hydraulic press for 2 minutes (Temp+360° F., Pressure=0 lbs);
3. Pressed for 2 minutes (Temp=360° F., Pressure=20,000 lbs.);

A. Pressing films onto 2"×2" metal sheet substrates:
1. Powder pressed into film between Mylar sheets as above;
2. Metal surface rinsed with acetone and air-dried;
3. Film pressed between metal plate and Mylar sheet, with second Mylar sheet below metal plate at same hydraulic press specifications.

B. Pressing films onto 4"×6" metal sheet substrates (for T-bends):
1. 3-gram powder samples used;
2. Repeated pressings between Mylar sheets as required to generate large enough films to cover samples;
3. Pressures of 30,000 lbs and above required as well, in some instances.

Molding of Physical Test Pieces

A. Polymer powders stabilized to guard against oxidative degradation:
750 ppm BHT
1000 ppm B225 (50/50 blend of Irganoz 1010 and Irgafos 168)
750 ppm DHT
1. Stabilizers (in powder form) added to 40-grams of powder and blended for at least 3 one-minute cycles of a Waring household blender on high speed;
2. Stabilized powders dried overnight at 80° C. under vacuum;
3. Powders blended as above for one more cycle before being poured into 6"×2½"×⅛" metal chase.

B. Compression molding:
1. Chase pressed between sheets of Mylar and between flat steel plates;
2. Compression molding on Wash press;
   Temperature=380° F.
   Low pressure cycle=500 psia, 5 min.
   High pressure cycle=25 tons, 7 min.
   Coding cycle automatic
3. Physical test pieces stamp-cut.

ANALYSES

Pentenol Comonomer Incorporation: Infrared Analysis

The simplest method of determining whether pentenol comonomer had been added to the copolymer backbone chain was to look for evidence of the pentenol's hydroxy group in an Infrared scan. IR analyses of each of the bench reactor homopolypropylene runs produced under similar conditions did find hydroxyl groups on the copolypropylene that suggested the presence of pentenol. Unfortunately, these IR analyses were only accurate in revealing hydroxyl presence in concentrations greater than about 0.3 mole percent, because homopolypropylene has an absorption in the same spectral region as the comonomer functionality. (Table H presents this IR data.)

IR analysis clearly demonstrates the incorporation of detectable amounts of comonomer in copolymers with a variety of melt flow values and isotacticities. The isotacticities are consistent with the isotactic index range of homopolymers with similar melt flows. Because the copolymers produced in the bench reactor scale-ups had comonomer concentrations clustering around 0.5 mole percent, additional proof of pentenol incorporation was sought to confirm IR indications. Melting point and molecular weight differences in the copolymer, as well as clear differences in physical and mechanical properties between copolymer and homopolymer films and molded parts aided IR results in assuring the formation of copolypropylene/pentenol.

Melting Point Depression

An initial comparison of melting points between a homopolymer film and a copolypropylene/pentenol film was made by melting the films on a hot stage microscope while monitoring temperature with a thermometer. The copolymer was found to melt between 162° C. and 164° C., while the homopolymer was found to melt at temperatures above 169° C. Although the accuracy of these specific melting point values was known to be strongly dependent upon duration of the test and even upon voltage setting of the microscope, the test served as a good indication of a significant decrease in melting point of the copolymer as compared to the homopolymer.

Stronger evidence of such a melting point depression in the copolymer was found in a DSC analysis. Illustrated in Table J, melting points of copolymers found in that analysis are lower in every case than those of analyzed homopolymers.

Molecular Weight Distribution: GPC Analysis

Table K details the GPC analyses of several scaled-up batches of copolypropylene/pentenol and of homopolymers of corresponding melt flows. While no clear correlations can be made between comonomer content or melt flow value and molecular weight, it should be noted that copolymers consistently have larger Mz values and broader distributions than do similar homopolymers.

Printability

Samples of copolymer (0.7 and 1.2 mole % pentenol) and homopolymer film beaded. They were easily and entirely removed by wiping the film with a dry paper towel. Water-soluble ink behaved similarly on the copolymer film. However, permanent marker ink and ball-point pen ink did not form beads on the copolymer surface. Rather, they dried smoothly onto the film. Once dry, they could not be removed entirely from the copolymer surface by rubbing with dry paper towels. Although substantial amounts of ink were removed, the copolymer film retained enough ink to display dark staining.

Paint Adhesion

Four film samples (two copolymer [0.6 mole % pentenol] and two propylene homopolymer) were painted with thin coatings of enamel spray paint (KRYLON Interior/Exterior Enamel). One copolymer sample was pressed onto a homopolymer sample, with paint between them. All four samples dried overnight at approximately 95° C. They were cooled for several hours at room temperature before their paint coatings were tested for adhesion to the films.

In cross-hatch tape tests (ASTM D3359-83), the paint coatings on the free film samples slit into test patterns with a scalpel and were easily removed with adhesive tape. The paint coating obviously failed to exhibit strong adhesion to either of the film substrates. However, the sandwich assembly of copolymer and homopolymer paint clearly demonstrated that there was a preferential adhesion to the copolymer film over the homopolymer. When the paint separated films that had been pressed together were separated, all of the paint between them peeled away from the homopolymer and adhered to the copolymer film.

This preferential adhesion of enamel spray paint to copolypropylene/pentenol film spurred on additional testing attempt to laminate polymer films with enamel spray paint. Since homopolypropylene film is usually oxidized prior to printing in order to improve its adhesion to inks, the homopolymer and copolymer (0.6 mole & pentenol) films in this test were oxidized before the spray paint was applied. The films were pressed onto 2"×2" samples of chemically-treated galvanized steel sheet (for support) and were passed through a Bunsen burner flame before they were spray painted and oven-, dried overnight (at approximately 95° C.). These films were removed from the oven, cooled at approximately 4° C. for seven hours, and finally brought to room temperature. Adhesive tape then easily removed most of the paint from the homopolymer film (no cross-hatching was used). But adhesive tape removed only a thin strip of paint form the bottom edge of the copolymer sample, possibly from the uncoated edge of the steel substrate. Clearly, the paint adhered more strongly to the preoxidized copolypropylene/pentenol film than to a comparable, pretreated homopolypropylene film.

Chemical Adsorption

The possibility that polar functional groups on the copolypropylene/pentenol might impart to it exceptional absorption of polar substances prompted comparison testing of homopolymer and copolymer powders exposed to vapors of volatile polar species, including water, acetone and isopropanol. One-gram samples of a range of propylene homopolymer and copolymer powder samples, which were produced under similar conditions in laboratory glassware reactions with varying modifier and comonomer concentrations, were first dried under vacuum at approximately 80° C. in aluminum mass pans. The samples were then suspended in closed desiccators above the liquid species and were weighed periodically to find mass gains indicating adsorption of vapors by the polymer powders. Table L reports results of these tests as amounts of polar species absorbed per standard time interval, in terms of weight percent of the polymer powders.

In short, the test provided no conclusive evidence of a difference in polar vapor absorption of copolypropylene powders over homopolypropylene powders. Exhaustive efforts to define and control the effects of such experimental problems as vapor adsorption by the mass pans, vapor pressure changes with temperature, and humidity changes outside of the desiccator failed to produce either cumulative or consistent mass changes in any of the powder samples. Because this test method was not a strong predictor as to whether copolypropylene/pentenol would absorb polar species in different quantities or rates than would homopolypropylene under similar conditions,-an alternative approach was used to answer the question with specific regards to water.

In accordance with ASTM 570-81 ("Water Absorption of Plastics"), copolypropylene and homopolypropylene film samples were immersed directly in boiling water for two hours and were then tested for mass changes presumed to represent water absorption. Despite the considerable loss in surface area in pressing polymer powders into films, this test was far more successful than were previous tests with powder samples in demonstrating consistent and numerically significant differences in water absorption of copolypropylene and homopolypropylene films. Under increased severity of direct liquid contact and boiling temperature, and possibly due to a concentration of hydroxyl groups at the surface of the copolypropylene film, the copolymer was found to absorb up to eight times (an average) the amount of water that the homopolymer absorbed. Table M presents these results as the "Percent Mass Change" of each polymer film sample per two hours boiling.

Further support of these results was found through a test that originally was intended to determine whether a copolypropylene film or a homopolypropylene film would allow more water vapor to be transmitted through itself. In this test, polymer films were stretched over the necks of a flask of boiling water. Within 24 hours of continuous exposure, the copolypropylene film whitened, cracked, and became thin and brittle enough to crumble easily in handling with fingers. The exposed section of homopolypropylene film demonstrated no corresponding changes in thickness, flexibility, transparency or strength. Infrared analyses comparing exposed sections of the copolypropylene film to sections that had been unexposed during the test confirmed that the surface of the copolypropylene film exposed to water vapor had been extensively oxidized. Once again, under severe test conditions (stretched film and boiling vapor temperatures), the copolypropylene film's response to water was far stronger than was that of the apparently unaffected homopolypropylene film.

Since it appeared that only the surface had been oxidized, the previously mentioned supposition of migration of hydroxyl groups to the surface of the film seems justified. One likely explanation of the film's mechanical degradation is that the oxidized hydroxy groups (carboxylic acid groups) have a very great affinity for water. The absorption by water induced volume changes and so asymmetrically stressed the film, promoting the observed degradation.

Adhesion to Metals

The discovery that the copolypropylene/pentenol adheres firmly to aluminum foil with heat pressing initiated a study of the inherent tendency of the copolymer to adhere to metals. Exploring a wide variety of untreated as well as coated metals, and testing adhesive strength with a battery of tests that included severe mechanical deformation, this study reveals an exceptional adhesion ability in copolypropylene/pentenol that sharply distinguishes it from homopolypropylene.

Tin Free Steel (TFS) was chosen as an initial test substrate because of its known affinity for organic coatings as well as for its interesting applications in the can packaging industry. Copolymer (0.6 mole % pentenol) and homopolymer powders were pressed into thin films, and those films were pressed onto $2\frac{1}{2}'' \times 2\frac{1}{2}''$ squares of TFS sheet. Both polymer coatings were tested for adhesion through cross-hatch tape tests and through impact deformation test.

The cross-hatch adhesion test (ASTM D3359-83) specifies use of a scalpel to slip 1 to $1\frac{1}{2}$ cm sections of coating into "cross-hatch" test patterns. Semitransparent pressure-sensitive adhesive tape was then applied to the test area and removed to attempt to peel the coating from its substrate. A closer inspection of the adhesion of polymer to TFS added to this tape test a microscopic examination of the cross-hatched test areas, in which a sharp tool was used to attempt to peel the test pattern of coating from the substrate.

Once the $2\frac{1}{2}'' \times 2\frac{1}{2}''$ coated test sheets of TFS had been assessed by cross-hatch evaluations, they were subjected to mechanical deformation produced by Gardner falling dart impact tests. Adhesion was then evaluated by cross-hatch tests and by attempted slitting and peeling with a sharp tool along bends in the metal, where the coating had been stressed and deformed.

In cross-hatch evaluations with tape and with microscopic evaluation, studies demonstrated a dramatic improvement in adhesion of the copolymer films to TFS as compared to the homopolymer films. Homopolymer films were easily removed by cross-hatch tape tests, peeling off as the cross-hatch test pattern was cut and eliminating from the entire $2\frac{1}{2}'' \times 2\frac{1}{2}''$ TFS sheets when the adhesive tape was applied and removed. Likewise, in response to mechanical deformation, the homopolymer coating was released from its substrate at every place where it had been deformed, delaminating completely upon slitting, tape-testing, or simply peeling by hand.

In contrast, the copolymer coatings adhered firmly to the TFS through cross-hatching and attempted removal with adhesive tape. Microscopic evaluation confirmed that the copolymer film could not be peeled from its substrate, even when probed with a sharp tool along the edges where it had been slit and "cross-hatched". Mechanical deformation was not more effective in removing the copolymer substrate: smooth, firm adhesion was observed along deformations where the polymer coating had been stretched—even along edges where the metal had been punctured! When these stressed areas of coating were slit or cross-hatched, the copolymer still could not be pulled from its substrate.

This striking improvement in adhesion by copolypropylene/pentenol encouraged further studies to determine the variety of metal substrates to which adhesion is improved by the copolymer and the strength of copolymer coating adhesion to TFS.

Variety of Substrates to which Adhesion is Improved by the Copolymer

To determine whether the copolymer would demonstrate the same improvement in adhesion over the homopolymer when coated onto substrates other than TFS, a battery of metals and coated steel sheets was selected: $1\frac{1}{2}''$-2" square samples of Copper, Brass, Aluminum, Stainless Steel, Galvanized Steel, Galvalume, Cold-Rolled Steel, Iron Phosphate-, Zinc Phosphate-, Terne-, and Bonderite-coated steel sheet were each coated with homopolymer and copolymer films. Coating adhesion was evaluated by cross-hatch tape tests.

In addition, copolymers of varying melt flow and comonomer content were compared against each other for adhesion to each substrate to determine whether these properties affect adhesion strength.

Table N presents results of these adhesion comparisons as numerical values, which have been assigned according to the "Classification of Adhesion Test Results" specified by ASTM D3359. Basically, higher numbers indicate greater adhesion.

Clearly the copolymers demonstrate far stronger adhesion to a wide range of substrates than does homopolypropylene film. Higher melt flow and greater comonomer content seem to enhance this adhesion improvement in the copolymer.

Strength of Copolymer Adhesion to Tin Free Steel

To evaluate the strength of the adhesion of copolymer coating to TSF, "T" Bend tests were used to produce mechanical deformation in copolymer-coated sheets of TFS, simulating the deformation that coated metal sheet might be required to withstand in industrial forming operatings.

A "T" Bend is an operation that bends a coated metal substrate over onto itself. The severity of the test depends on the radius of the bend, which is described as a function of the thickness of the substrate. In other words, the number of thicknesses of metal that comprise the bending radius is used to label the test—"nT." Hence, the lower the n value, the narrower the bend radius, the greater the stress at the bend, and the greater the severity of the test. The integrity of the coating at the bend may be evaluated by tape test, by microscopic examination for cracks and peeling, and by slitting with a sharp edge and attempting to remove the coating by peeling.

Two such "T" Bends were performed on 3-4 mil coatings of copolypropylene/pentenol (0.6 mole % pentenol) on TFS:

1. Standing T: a 4"×6" coated sample was passed through a machine that put approximately a 3T bend in the substrate.

2. Rolled T: narrower coated samples were rolled manually and cold-pressed to 0T, 1T, 2T, 3T, and 4T Bends.

In the Standing T test, the copolymer film maintained strong adhesion: it could not be removed by peeling, even when slit with a sharp edge along the bend. Its performance in the Rolled T tests was equally as strong. In a 0T bend (substrate bent over on self once), some cracking and stress whitening were observed, but no adhesion loss was detectable by tape test or by slitting and attempted peeling. In a 3T bend (substrate bent over on self four times), no adhesion loss, no microcracking, and no stress whitening were observed.

The significance of "T" Bends in describing the strength of copolypropylene/pentenol adhesion to TFS is apparent when the severity of the "T" Bends is appreciated. A Standing T is severe enough to remove the Zinc coating from Galvanized steel. The appliance industry requires coated sheet to pass a 6T bend to assure that it will retain its coating during forming operations. Building supply sheet (used, for example, in "do-it-yourself" outdoor shed (kits) requires metal sheet that passes a 4T bend. The fact that copolypropylene/pentenol maintained strong adhesion to TFS in tests more stringent than these implies a promising range of applications for the copolymer as a coating, even under demanding circumstances of use.

Mechanical Behavior

Molded samples for physical testing were produced according to the method under the heading "Molding of Physical Test Pieces", above. In the development of this method, compression molding was chosen to conserve material, and the stabilization package described was tested in an oven-aging study. To determine whether or not two stabilizers chosen would adequately protect the polymers during the molding process, one stabilized and one unstabilized sample each of homopolypropylene (with Irganox 1010) and copolymer (0.6 mole % pentenol), as well as one less stabilized control homopolymer (with Irganox 1010) were oven-aged at 150° C. for 25 hours. The study assured that the stabilizers would provide sufficient protection from oxidative degradation during molding. Stabilizing samples survived the full duration of the test without significant changes in color, gloss, texture, or surface hardness; the less stabilized control homopolymer was visibly oxidized within 13 hours and the unstabilized copolypropylene/pentenol showed signs of oxidation within two hours.

Once the stabilization and molding procedure had been proven adequate, 40-gram samples of copolymers and homopolymers of various melt flows, and one sample of plant-produced copolypropylene/pentenol were compression molded and stamped into test samples. Tensile, flex, Izod impact, heat distortion, and Rockwell hardness tests were used to assess the effects of pentenol comonomer on mechanical properties at several different melt flows. Parallel tests were run on plant copolymer samples to gauge the accuracy of the tests determined by the plant to those determined in this study, the limitations in compression molding capabilities became obvious. Air bubbles, rough surfaces, and imperfect edges on test pieces limit the test data provided on Table O to use in general comparisons between copolymers and corresponding homopolymers only.

The most significant differences in mechanical behavior between copolypropylene/pentenol and homopolymer were a dramatic increase in break elongation with increasing comonomer content and a much improved Izod impact strength in the copolymer sample with highest comonomer content. Copolymers also demonstrated slightly lower tensile strengths, longer yield elongations, higher break strengths, heat distortion temperatures between those of homopolypropylene and copolypropylene/ethylene, and Rockwell hardnesses in the homopolypropylene range, (generally higher than those of copolypropylene/ethylene).

TABLE H

| | PENTENOL INCORPORATION: INFRARED ANALYSES | | | |
|---|---|---|---|---|
| | Run # | Mol % Comonomer | Melt Flow | Isotactic Index, % |
| Homopolymers | 057 | 0 | 0.15 | 99.03 |
| | 450 | 0 | 4.28 | 97.96 |
| | 143 | 0 | 11.6 | 95.5 |
| Copolymers | 452 | 0.69 | 0 | 92.64 |
| | 461 | 0.60 | 0.10 | 98.65 |
| | 451 | 0.23 | 0.13 | n.a. |
| | 462 | 0.50 | 0.21 | 98.45 |
| | 455 | 0.58 | 8.79 | 96.22 |
| | 463 | 0.43 | 11.70 | 95.28 |
| | 470 | 1.2 | 0 | 96.50 |

TABLE J

MELTING POINT DEPRESSION: DSC ANALYSIS

| | Run # | Mol % Comonomer (by IR analysis) | Melting Temp. (°C.) |
|---|---|---|---|
| Homopolymers | 057 | 0 | 164.9 |
| | 143 | 0 | 163.2 |
| Copolymers | 463 | 0.43 | 157.5 |
| | 462 | 0.5 | 161.7 |
| | 461 | 0.6 | 161.7 |
| | 470 | 1.2 | 155.3 |

TABLE K

MOLECULAR WEIGHT DISTRIBUTION: GPC ANALYSIS

| Run # | Mol % Comonomer | Melt Flow | Mn (1000) | Mw (1000) | Mw/Mn | Mz (1000) |
|---|---|---|---|---|---|---|
| | | Homopolymers | | | | |
| 057 | 0 | 0.15 | 101 | 477 | 4.71 | 1327 |
| 143 | 0 | 11.6 | 42.8 | 230.7 | 5.39 | 881.1 |
| | | Copolymers | | | | |
| 463 | 0.43 | 11.7 | 40.1 | 270.1 | 6.74 | 1334.2 |
| 462 | 0.5 | 0.21 | 60.2 | 422 | 7.01 | 1433 |
| 461 | 0.6 | 0.10 | 88.2 | 594 | 6.74 | 1697 |
| 470 | 1.2 | 0 | 126.9 | 657.7 | 5.18 | 1960.3 |

TABLE L

ADSORPTION OF POLAR VAPORS BY POLYMER POWDERS

| Run # | Mol % Comonomer | wt. % Acetone Absorbed (on average) Trial 1 | Trial 2 | wt. % Water Absorbed (on average) | wt. % Isopropanol Absorbed (on average) |
|---|---|---|---|---|---|
| 416 | 0 | 1.36 ± .5 | 1.86 ± .7 | .23 ± .2 | 1.16 ± .3 |
| 427 | 0 | 1.72 ± .3 | 1.64 ± .4 | .26 ± .4 | 1.22 ± .3 |
| 107A | 0 | 2.48 ± .2 | | .07 ± .04 | |
| 415 | .56 | 2.07 ± 1.4 | 2.63 ± .9 | .01 ± .2 | 1.63 ± .4 |
| 419 | 1.2 | .95 ± .2 | | 0 ± .1 | |

TABLE M

WATER ABSORPTION OF FILMS

| Run # mol % Comonomer | 441, homopolymer 0 | | | | 107A, homopolymer 0 | | | | 415, copolymer .56 | | | |
|---|---|---|---|---|---|---|---|---|---|---|---|---|
| Sample | A | B | C | Avg | A | B | C | Avg | A | B | C | Avg |
| Percent Mass Change | | | | | | | | | | | | |
| Trial 1 | | .2 | | .2 | | .6 | | .6 | | 1.9 | | 1.9 |
| Trial 2 | −.4 | −.3 | .7 | 0 | .3 | −1.7 | .3 | −.4 | 1.7 | 1.2 | 1.3 | 1.4 |
| Trial 3 | .8 | .6 | .8 | .7 | .3 | .4 | .3 | .3 | 1.7 | 2.1 | 1.7 | 1.8 |
| Average | | | | .3 | | | | .2 | | | | 1.7 |

TABLE N

ADHESION TO METALS

| | Run # | | | |
|---|---|---|---|---|
| | 57, homo-polymer | 461, co-polymer | 463, co-polymer | 470, co-polymer |
| mol % Comonomer | 0 | .6 | .43 | 1.2 |
| Melt Flow | .15 | .10 | 11.70 | 0 |
| Adhesion | | | | |
| TFS | 0 | 5 | | |
| Copper | 0 | 4 | 5 | 4 |
| Brass | (S)* | 0 | 4 | 4 |
| Aluminum | 0 | 4 | 5 | 4 |
| Stainless Steel | 0 | 1 | 2 | 5 |
| Galvanized Steel | (S)* | 0 | 1 | 1 |
| Galvalume | 0 | 0 | 0 | 0 |
| Cold Rolled Steel | (S)* | 0 | 5 | 1 |
| Iron Phosphate coated steel | 4 | 5 | 5 | 5 |
| Zinc Phosphate coated steel | 1 | 5 | 5 | 5 |
| Terne coated steel | 0 | 5 | 3 | 5 |
| Bonderite coated steel | 0 | 4 | 4 | 1 |

*(S) designation implies spontaneous delamination of polymer film from metal substrate

TABLE O

MECHANICAL BEHAVIOR OF MOLDED POLYMERS

| | Run # | | | |
|---|---|---|---|---|
| | 57 Homopolymer | 461 Copolymer | 143 Homopolymer | 463 Copolymer |
| mol % Pentenol Comonomer | 0 | .6 | 0 | .43 |
| Melt Flow | .15 | .10 | 11.6 | 11.7 |
| Flex Modulus (psi) | 2.33 × 10⁵ ± .12 | 2.13 × 10⁵ ± .10 | — | — |
| Tensile* | | | | |
| Yield strength (psi) | 4500 ± 39 | 4377 ± 111 | 4730 ± 2.3 | 4151 ± 81 |
| Yield Elongation (%) | 7.3 ± .4 | 7.6 ± .4 | 5.3 ± .2 | 6.0 ± 0 |
| Break Strength (psi) | 1459 ± 255 | 1889 ± 377 | — | — |
| Break Elongation (%) | 49 ± 16 | 148 ± 36 | — | — |
| Heat Distortion (66 psi) | 298 | 280 | — | — |
| Temp. (°F.) (264 psia) | 153 | 147 | — | — |
| Izod Impact (ft-lb/in) | 1.08 ± .09 | .93 ± .11 | .48 ± .03 | .50 ± .03 |
| Rockwell Hardness ("R" scale) | 97 ± 4 | 102 ± 13 | 102 ± 2 | 97 ± 4 |

| Run # | Ethylene/ | Values |
|---|---|---|
| 470 | Propylene | Reported |

TABLE O-continued

MECHANICAL BEHAVIOR OF MOLDED POLYMERS

|  | Copolymer | Copolymer | by Plant |
|---|---|---|---|
| mol % Pentenol Comonomer | 1.2 | 0 |  |
| Melt Flow | 0 | 4.2 | 4.1 |
| Flex Modulus (psi) | $1.18 \times 10^5 \pm .01$ | $1.57 \times 10^5 \pm .05$ | $1.55 \times 10^5$ |
| Tensile* |  |  |  |
| Yield strength (psi) | $3416 \pm 166$ | $3012 \pm 157$ | 3650 |
| Yield Elongation (%) | $10 \pm 0$ | $6.9 \pm .7$ | 12.4 |
| Break Strength (psi) | $4896 \pm 364$ | $2069 \pm 539$ | — |
| Break Elongation (%) | $380 \pm 90$ | $19 \pm 5$ | — |
| Heat Distortion (66 psi) | — | 264 | — |
| Temp. (°F.) (264 psia) | — | 139 | — |
| Izod Impact (ft-lb/in) | CB$2.31 \pm 0$ HB$5.75 \pm .67$ | $1.16 \pm .39$ | 2.5 |
| Rockwell Hardness ("R" scale) | $80 \pm 2$ | $72 \pm 4$ | — |

*All tensile tests run at .2 in 1 min crosshead speed

We claim:

1. A compound of the formula

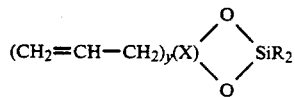

where y is 1 or 2, (X) is a connecting hydrocarbyl fragment other than an unsaturated non-cyclic hydrocarbyl, and other than an unsaturated cyclic non-aromatic hydrocarbyl, having from 1 to about 20 carbon atoms, each R is independently selected from alkyl, alkoxy, alicyclic, aryloxy, alkaryl and aryl groups having from 1 to about 20 carbon atoms, provided that the total of carbon atoms in all R's together with all carbons directly attached to the carbon in X connected to an 0 is at least 5, and with the proviso as above.

* * * * *

UNITED STATES PATENT AND TRADEMARK OFFICE
CERTIFICATE OF CORRECTION

PATENT NO. : 5,329,037

DATED : July 12, 1994

INVENTOR(S) : Andrew J. Sivak and Leonard A. Cullo

It is certified that error appears in the above-identified patent and that said Letters Patent is hereby corrected as shown below:

Col. 6, line 63, change the word "met" to read "mer".
Col. 10, line 54, change the "-" to "=".
Col. 16, line 50, change "comchomers" to read "comonomers".
Col. 18, place TEA 0.063 in the "Nme" column, which will place other entries in the row in correct columns.
Col. 17, under "Cmpd" column, the 2nd 4 under column entitled Conc.(M), the No. .0175 should be moved down onto the next row across from $SiMe_3$.
Col. 17 under the column entitled "Cmpd.", under the No. 5, Col. entitled "Conc.(M)", No. .0156 should be moved into the new row across from $SiMe_3$.
Col. 19 under Col. entitled "Cmpd" under the 1st No. 4, under the fraction 0/10 should be moved up 1 row across from nC7.

UNITED STATES PATENT AND TRADEMARK OFFICE
CERTIFICATE OF CORRECTION

PATENT NO. : 5,329,037
DATED : July 12, 1994
INVENTOR(S) : Andrew J. Sivak and Leonard A. Cullo It is certified that error appears in the above-identified patent and that said Letters Patent is hereby corrected as shown below:

Col. 22, under Col. entitled "$M_n 1000$", change No. "30.02" to "38.2".
Col. 22, under last col. entitled $M_w/M_n$ 2nd number "4.06" change to "4.86".
Col. 22, Table E-continued, line 39, the word "crystalliation" should be corrected to read "crystallation".
Col. 23, Chart G1, 4th col. entitled mm/l, the abbreviation "conc." should be above the mm/l
Col. 33, row 58, remove the apostrophe.
Col. 34, Table H, in the 1st col. (unamed) the word "Homopolymers should be moved to line 60.
Col. 34, Table H, in 1st col. (unnamed) the word "Copolymers" should be moved to line 64.

Signed and Sealed this

First Day of September, 1998

*Attest:*

BRUCE LEHMAN

*Attesting Officer*   Commissioner of Patents and Trademarks